April 5, 1938.　　　B. M. SHIPLEY ET AL　　　2,113,412
ACCOUNTING MACHINE
Original Filed June 28, 1933　　14 Sheets-Sheet 1
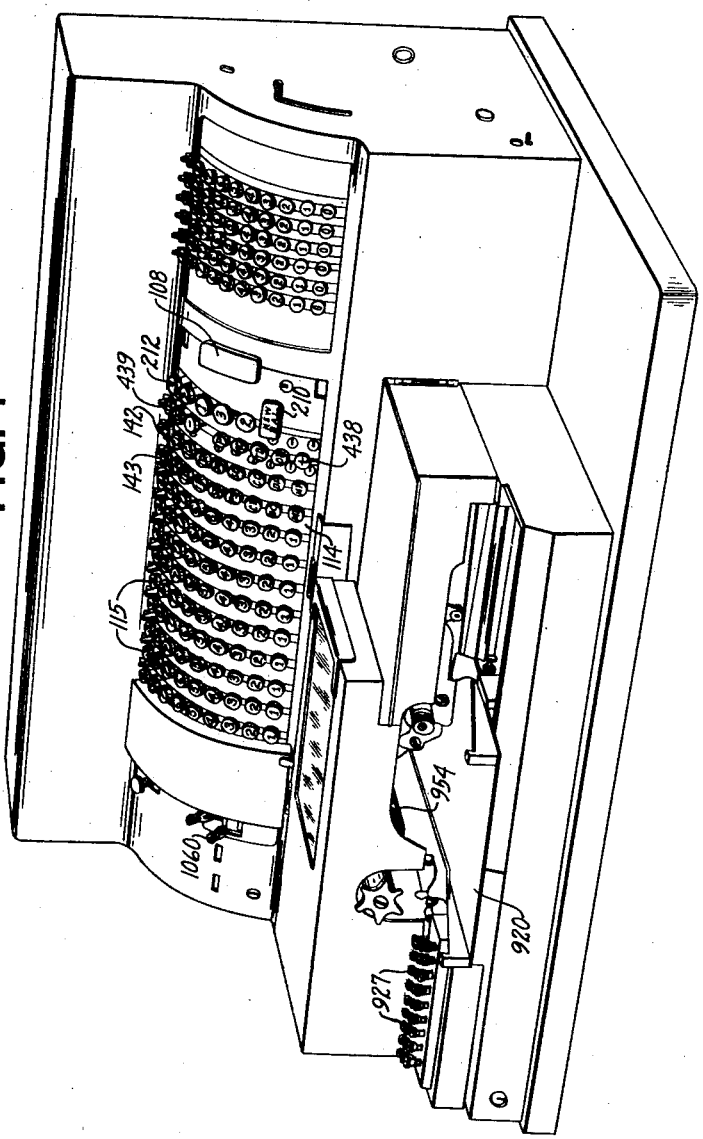
Inventors
Bernis M. Shipley
Pascal Sburlino and
Everett H. Placke
By
Their Attorney April 5, 1938.  B. M. SHIPLEY ET AL  2,113,412
ACCOUNTING MACHINE
Original Filed June 28, 1933   14 Sheets-Sheet 2
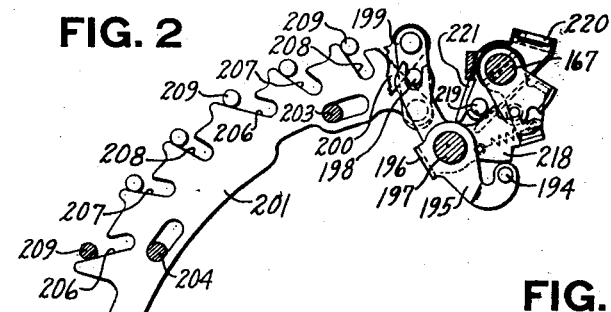
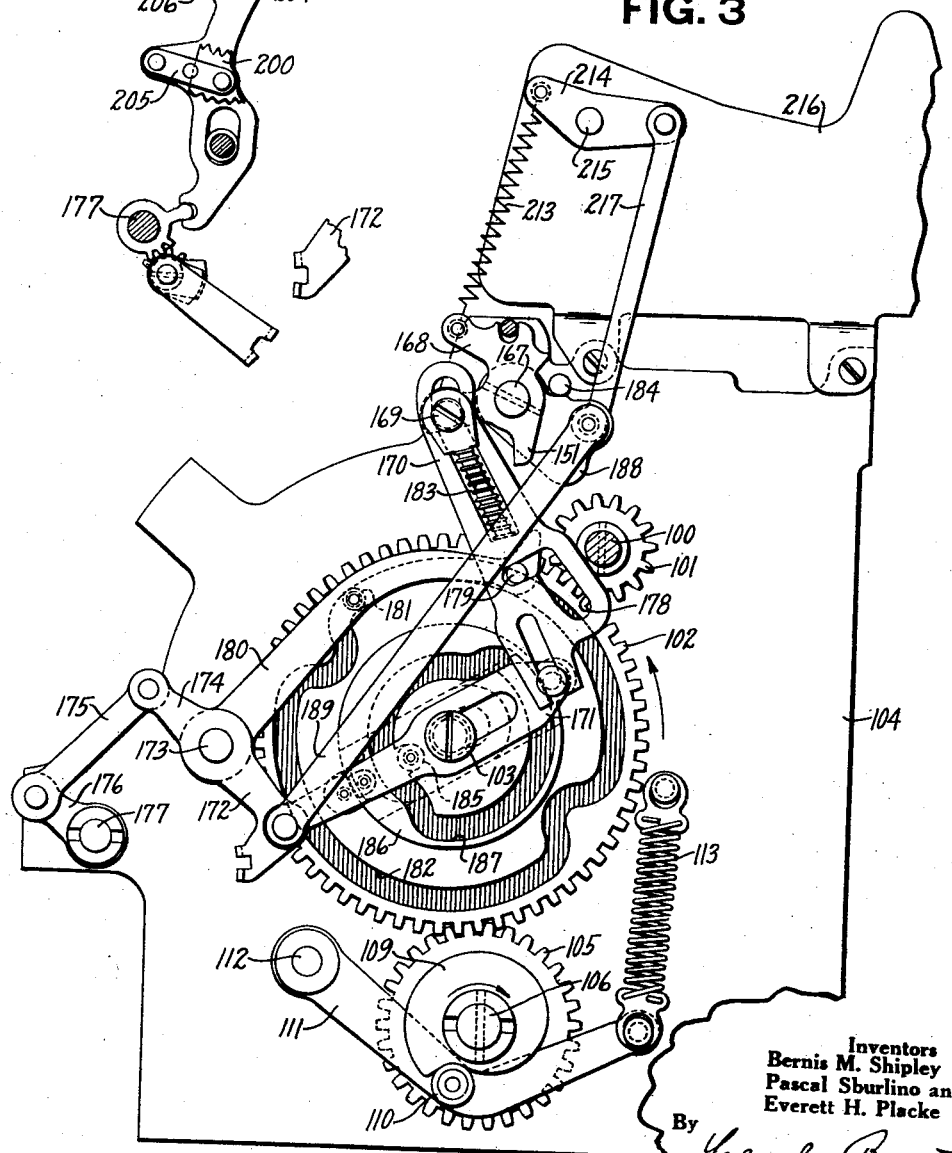
Inventors
Bernis M. Shipley
Pascal Sburlino and
Everett H. Placke
By Earl Beust
Their Attorney

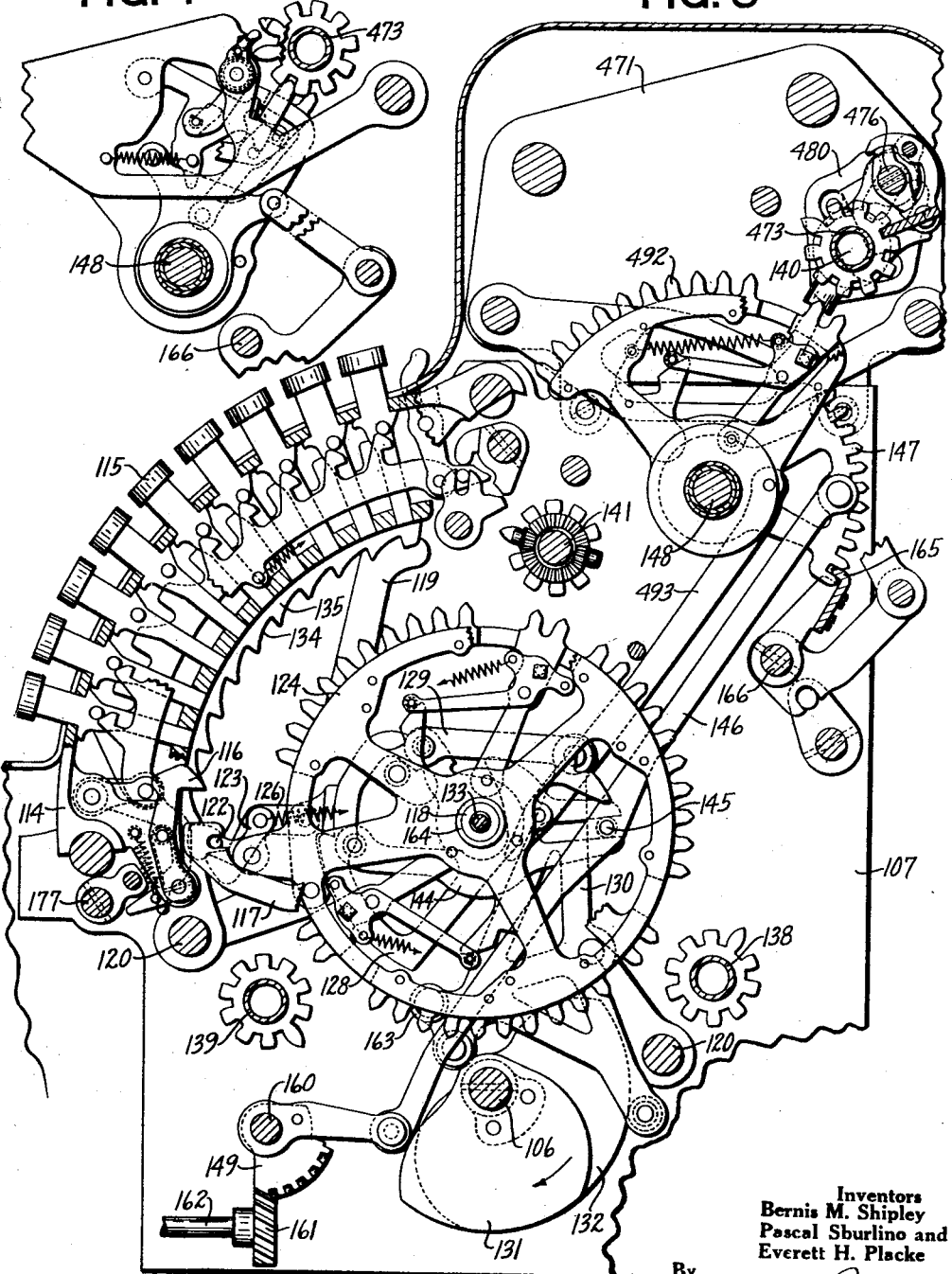

April 5, 1938.  B. M. SHIPLEY ET AL  2,113,412
ACCOUNTING MACHINE
Original Filed June 28, 1933  14 Sheets-Sheet 5

Inventors
Bernis M. Shipley
Pascal Sburlino and
Everett H. Placke
By
Their Attorney

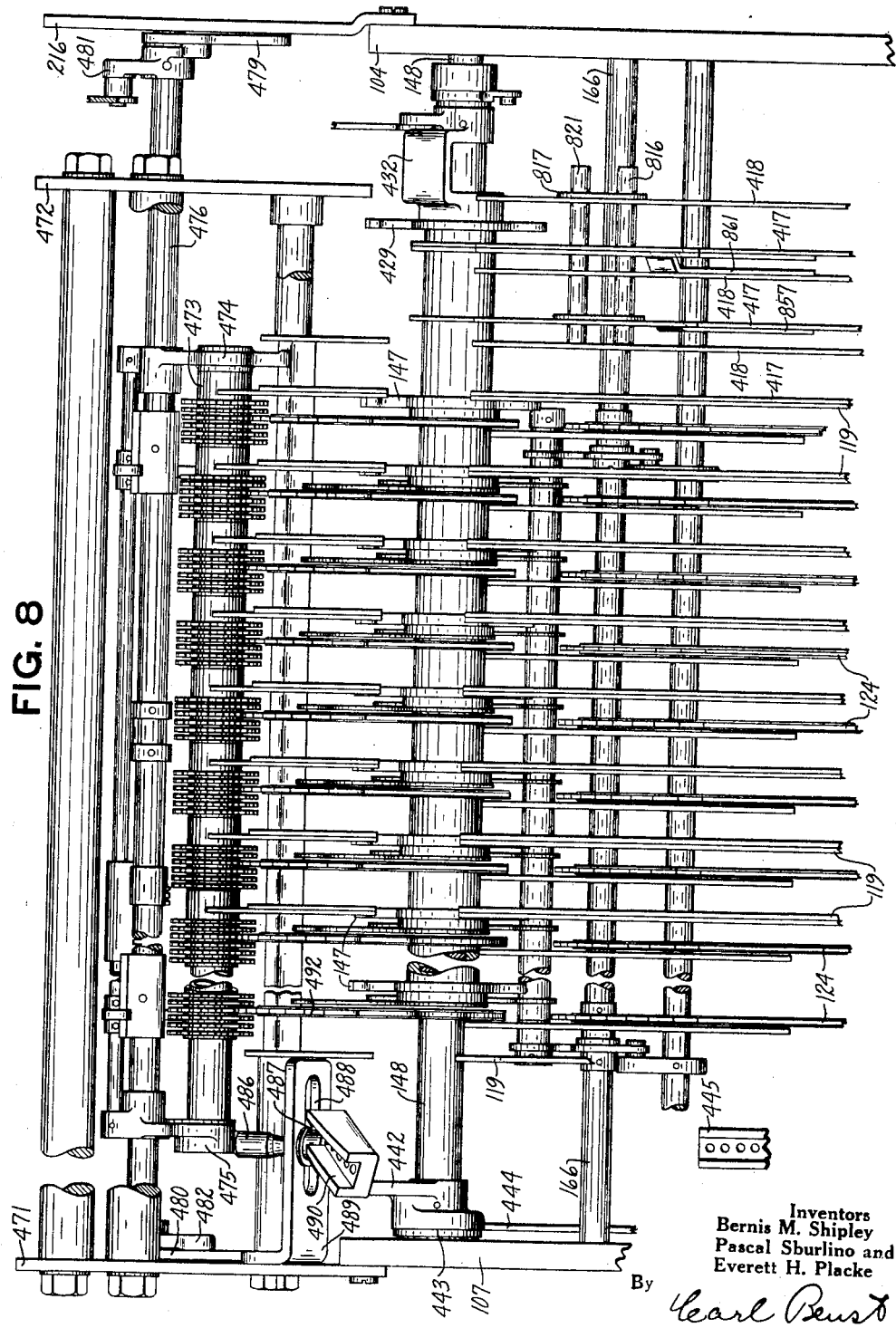

April 5, 1938.  B. M. SHIPLEY ET AL  2,113,412
ACCOUNTING MACHINE
Original Filed June 28, 1933  14 Sheets-Sheet 7
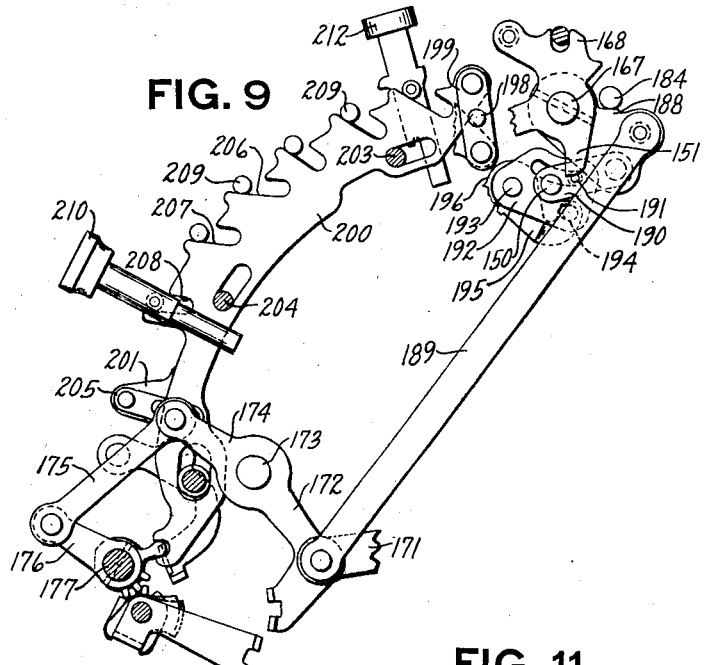
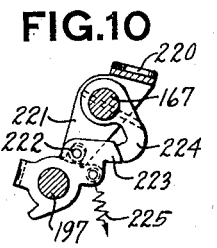
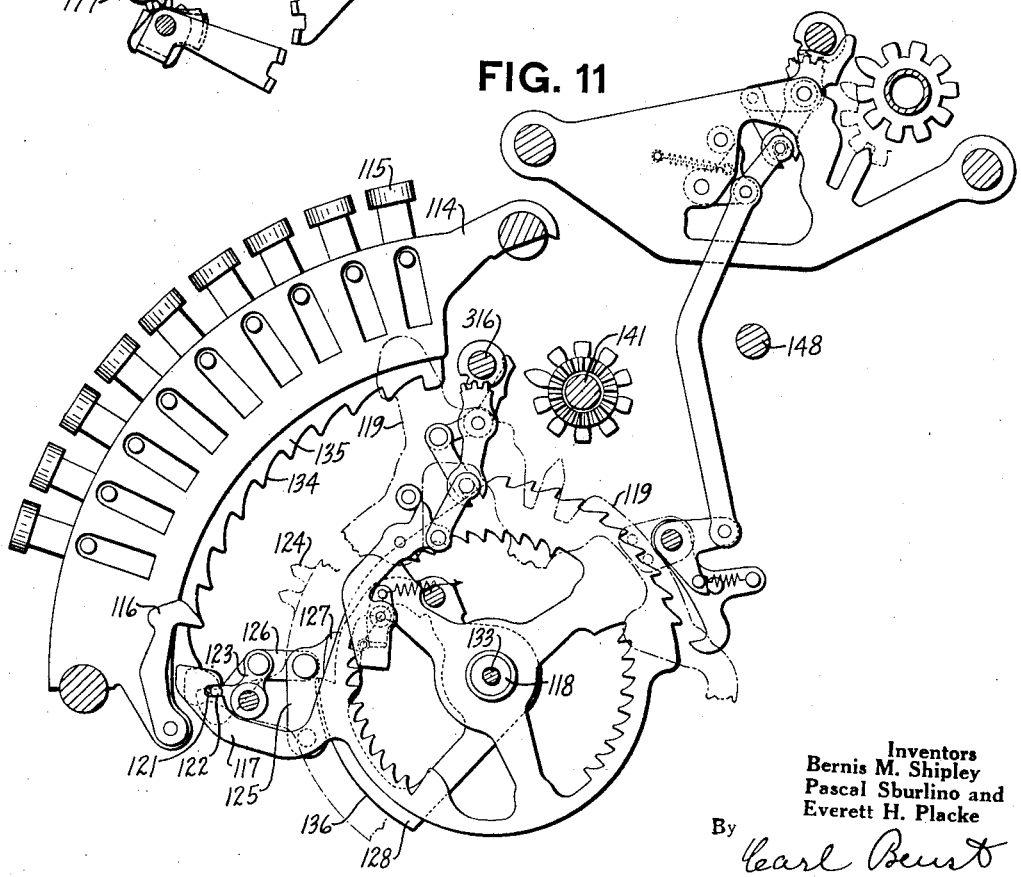
Inventors
Bernis M. Shipley
Pascal Sburlino and
Everett H. Placke
By Carl Beust
Their Attorney April 5, 1938.　　B. M. SHIPLEY ET AL　　2,113,412
ACCOUNTING MACHINE
Original Filed June 28, 1933　　14 Sheets-Sheet 8
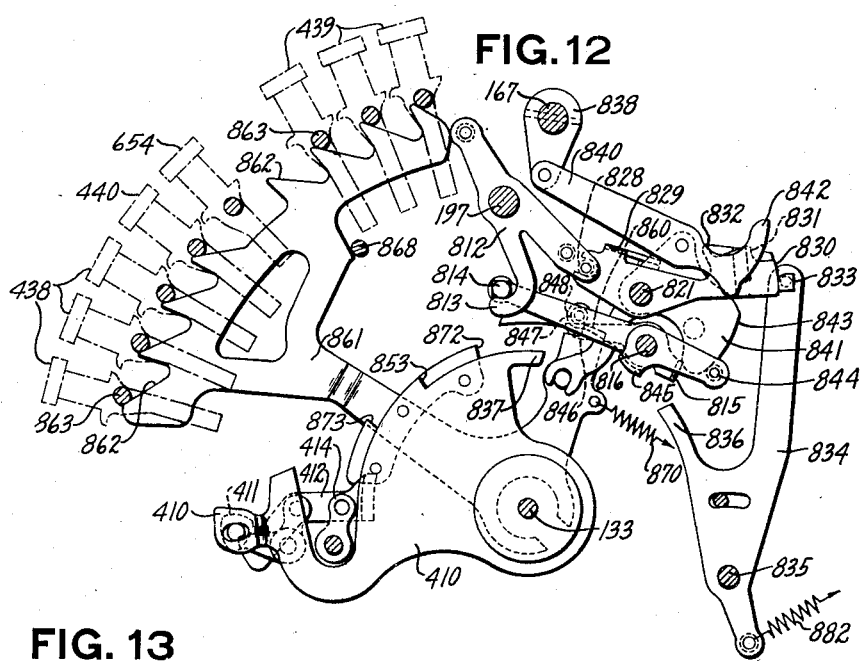
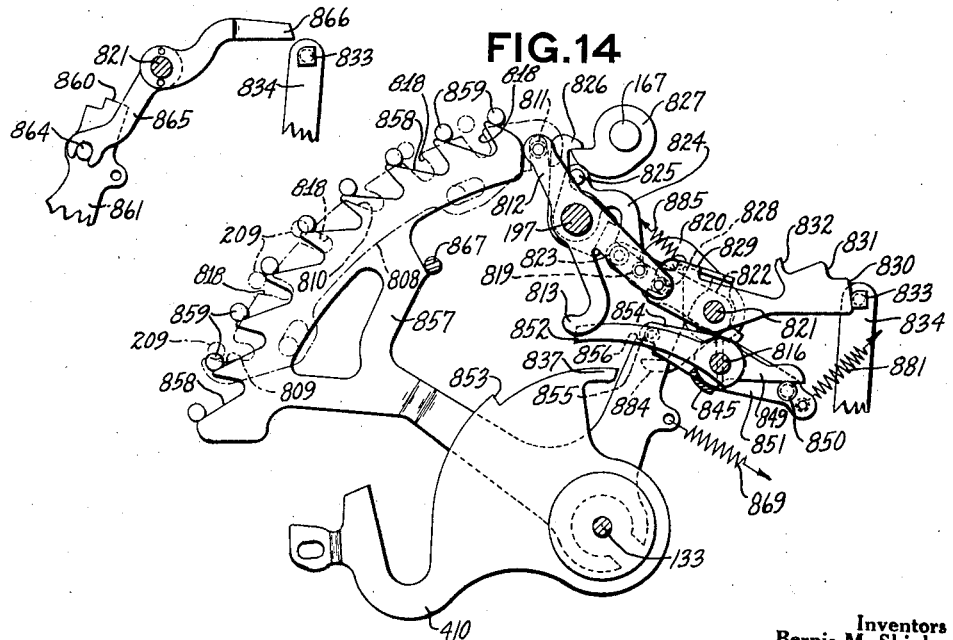
Inventors
Bernis M. Shipley
Pascal Sburlino and
Everett H. Placke
By
*Earl Beust*
Their Attorney April 5, 1938. B. M. SHIPLEY ET AL 2,113,412
ACCOUNTING MACHINE
Original Filed June 28, 1933    14 Sheets-Sheet 9

Inventors
Bernis M. Shipley
Pascal Sburlino and
Everett H. Placke
By Carl Beust
Their Attorney April 5, 1938.    B. M. SHIPLEY ET AL    2,113,412
ACCOUNTING MACHINE
Original Filed June 28, 1933    14 Sheets-Sheet 10

FIG. 17

NAME JOHN DOE  ACC. NO. 12357

| | DATE | OLD BAL. | DEBIT | CREDIT | NEW BAL. | | TR. | ACC.NO |
|---|---|---|---|---|---|---|---|---|
| 1 | | 8***5,000.00 | | ****150.00 | | 1 | CI | 12357 |
| 2 | | | | *****60.00 | | 2 | TC | |
| 3 | | | | *****25.00 | | 3 | IC | |
| 4 | | | ****300.00 | | | 4 | LP | |
| 5 | | | *****60.00 | | | 5 | TP | |
| 6 | JUL-1-33 | | *****25.00 | | ****4850.00 | 6 | IP | |

| | DATE | OLD BAL. | DEBIT | CREDIT | NEW BAL. | | TR. | ACC.NO |
|---|---|---|---|---|---|---|---|---|
| 1 | JAN-14-33 | 8****0.78 | | **5.60 | --****6.38 | 1 | CC | 12731 |
| 2 | | | | | | 2 | | |

| | DATE | DEBIT | | | | | |
|---|---|---|---|---|---|---|---|
| 1 | JAN14-33 | **50,780.00 | | | | 22 | LP E |
| 2 | JAN14-33 | ***677.48 | | | | 21 | PI E |
| 3 | JAN14-33 | ****780.00 | | | | 21 | IP E |
| 4 | JAN14-33 | ****74.80 | | | | 19 | TP E |
| 5 | JAN14-33 | ****790.56 | | | | 22 | SR E |
| 6 | JAN14-33 | *****45.60 | | | | 22 | PS E |
| 7 | JAN14-33 | ****457.00 | | | | 20 | CD E |
| 8 | JAN14-33 | **2300.00 | | | | 20 | DC E |
| 9 | JAN14-33 | ******0.00 | | | | 24 | NR E |
| 10 | JAN14-33 | | DEBIT TOTAL | ***76605.44 | | | E |
| 11 | JAN14-33 | | OLD DEB.BAL | ***49615.60 | | | |
| 12 | JAN14-33 | | NEW CR.BAL | ***58009.70 | | | |
| 13 | JAN14-33 | CREDIT | BALANCE | --*184230.74 | | | |
| 14 | JAN14-33 | ******0.00 | | | | 22 | LDE |
| 15 | JAN14-33 | ******0.00 | | | | 22 | CIE |
| 16 | JAN14-33 | ******5.60 | | | | 22 | ICE |
| 17 | JAN14-33 | ******5.60 | | | | 22 | TCE |
| 18 | JAN14-33 | *****71.20 | | | | 22 | SWE |
| 19 | JAN14-33 | ******6.01 | | | | 22 | SCE |
| 20 | JAN14-33 | ******0.00 | | | | 22 | CCE |
| 21 | JAN14-33 | *****33.57 | | | | 22 | DPE |
| 22 | JAN14-33 | ******6.04 | | | | 22 | NPE |
| 23 | JAN14-33 | | CREDIT TOTAL | *****128.02 | | | |
| 24 | JAN14-33 | | OLD CR. BAL | ***65171.78 | | | |
| 25 | JAN14-33 | | NEW DEB.BAL | **118930.94 | | | |
| 26 | JAN14-33 | | BALANCE | **184230.74 | | | |
| 27 | | | | | | | |

—948

Inventors
Bernis M. Shipley
Pascal Sburlino and
Everett H. Placke
By Carl Beust
Their Attorney April 5, 1938.  B. M. SHIPLEY ET AL  2,113,412
ACCOUNTING MACHINE
Original Filed June 28, 1933   14 Sheets-Sheet 11
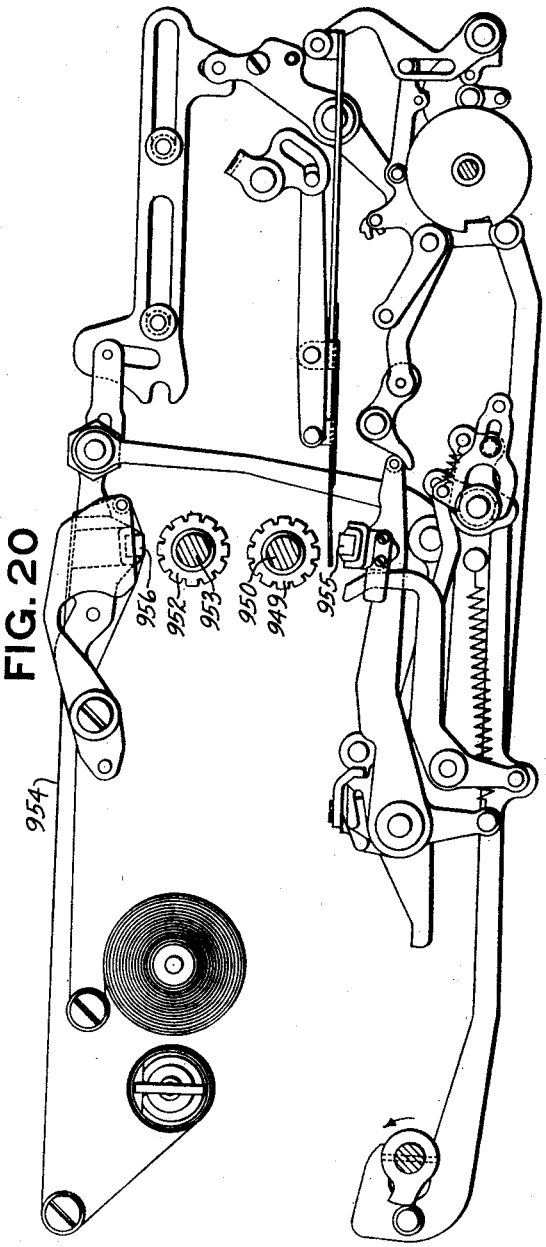
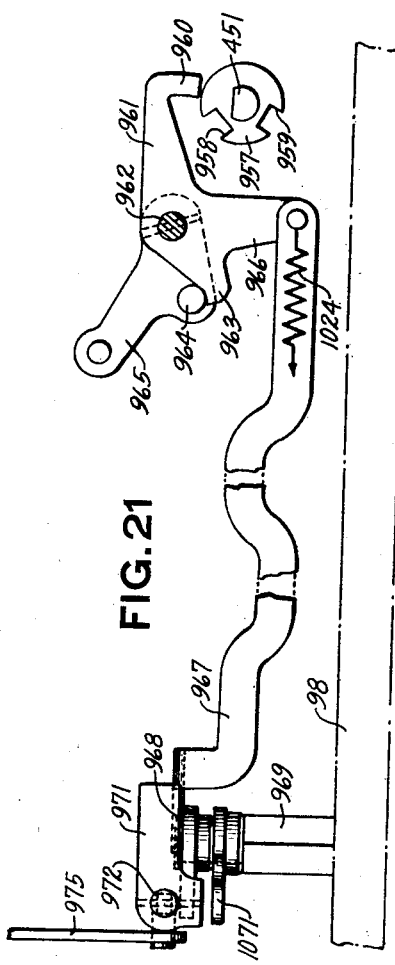
Inventors
Bernis M. Shipley
Pascal Sburlino and
Everett H. Placke
By
*Carl Benst*
Their Attorney April 5, 1938.                 B. M. SHIPLEY ET AL                 2,113,412
                                 ACCOUNTING MACHINE
                       Original Filed June 28, 1933   14 Sheets-Sheet 12
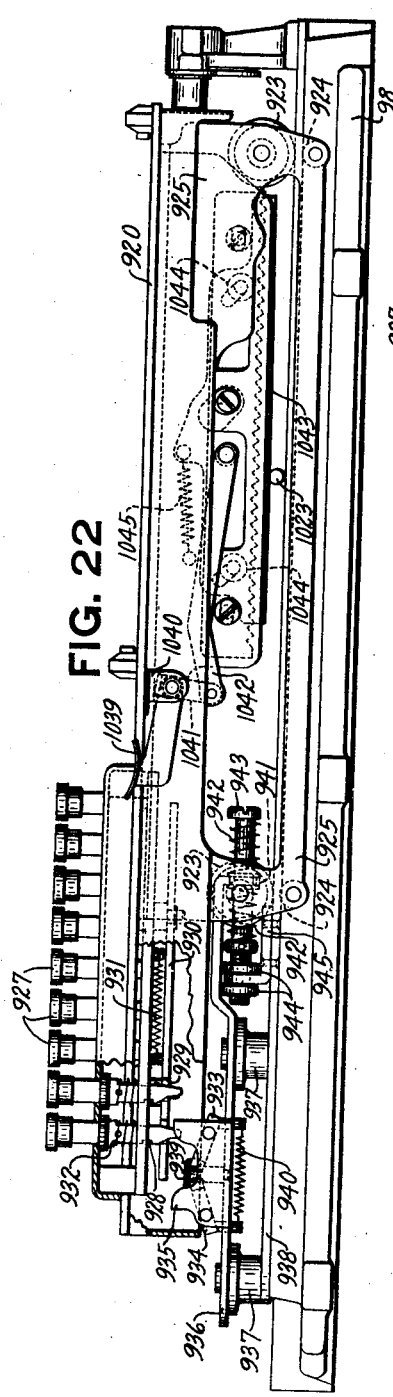
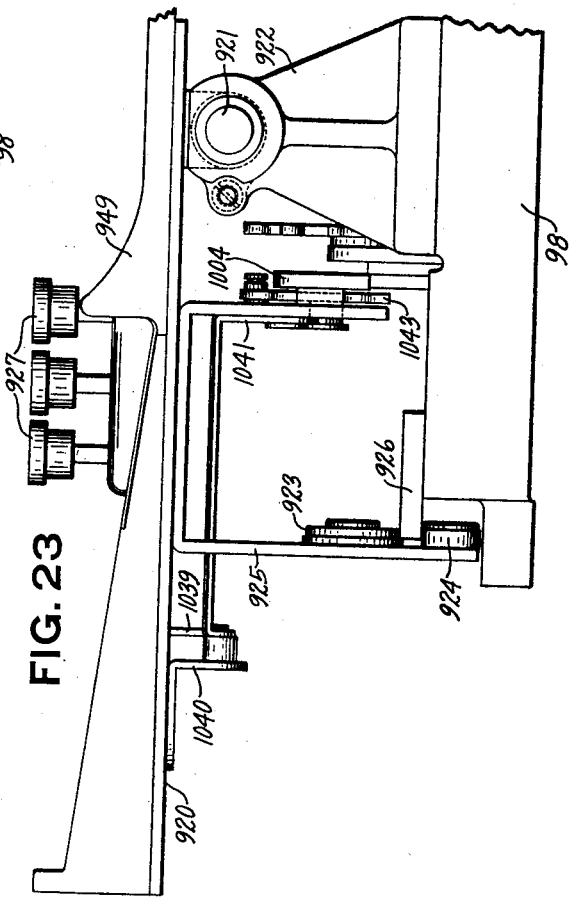
Inventors
Bernis M. Shipley
Pascal Sburlino and
Everett H. Placke
By
Their Attorney April 5, 1938.  B. M. SHIPLEY ET AL  2,113,412
ACCOUNTING MACHINE
Original Filed June 28, 1933  14 Sheets-Sheet 13
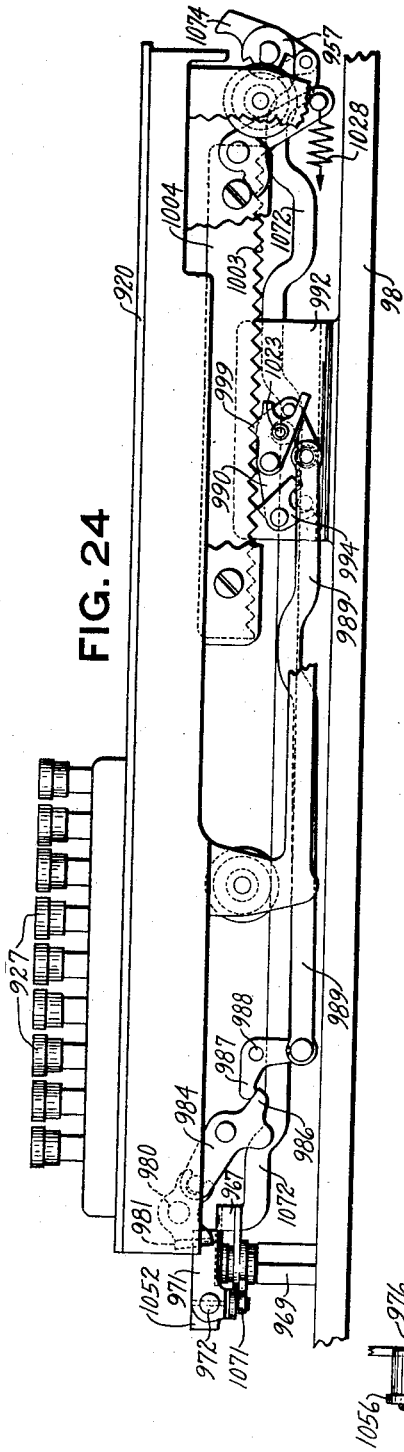
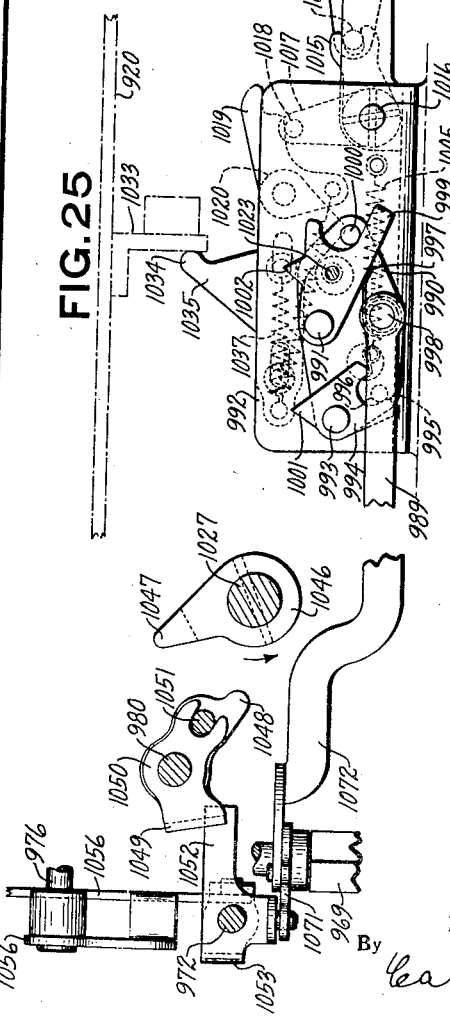
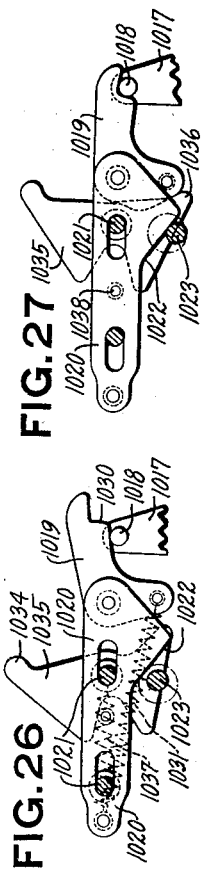
Inventors
Bernis M. Shipley
Pascal Sburlino and
Everett H. Placke
By *Carl Beust*
Their Attorney April 5, 1938.  B. M. SHIPLEY ET AL  2,113,412
ACCOUNTING MACHINE
Original Filed June 28, 1933  14 Sheets-Sheet 14
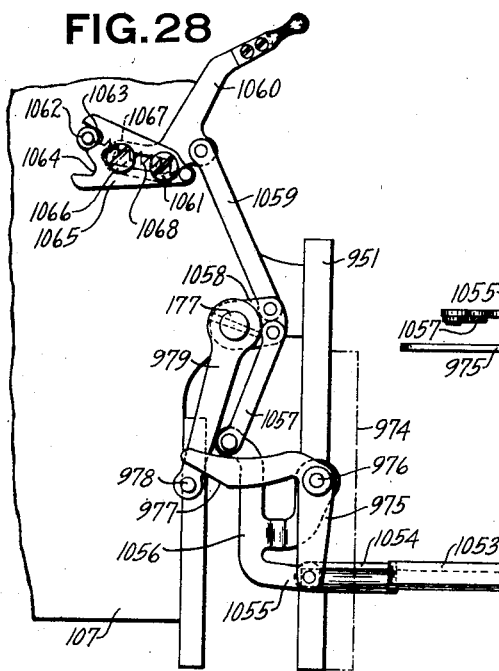
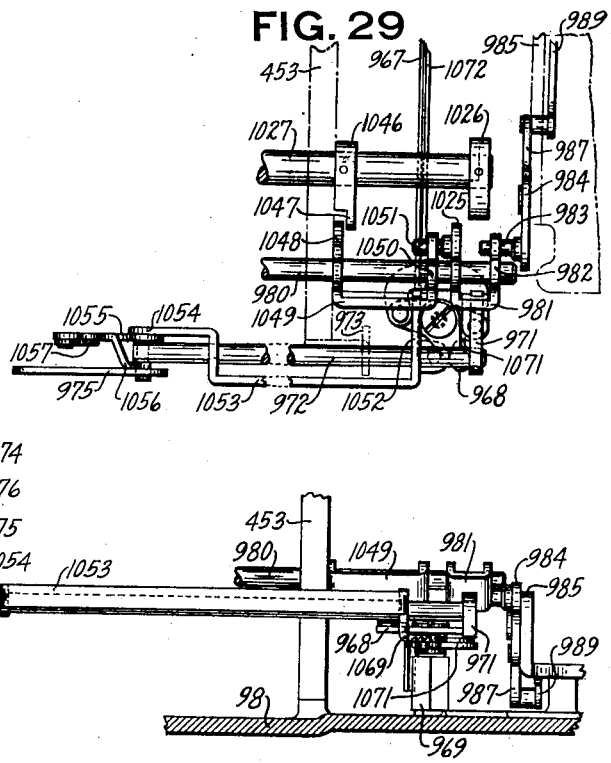
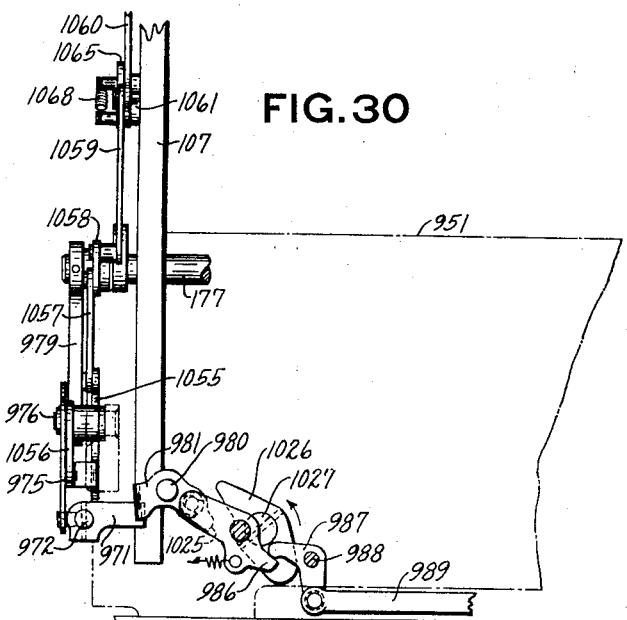
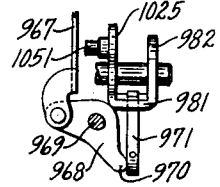
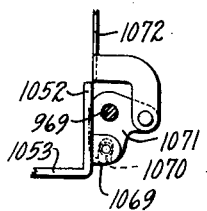
Inventors
Bernis M. Shipley
Pascal Sburlino and
Everett H. Placke
By Carl Benst
Their Attorney Patented Apr. 5, 1938

2,113,412

UNITED STATES PATENT OFFICE 2,113,412

ACCOUNTING MACHINE

Bernis M. Shipley, Pascal Sburlino, and Everett H. Placke, Dayton, Ohio, assignors to The National Cash Register Company, Dayton, Ohio, a corporation of Maryland Original application June 28, 1933, Serial No. 677,980. Divided and this application July 27, 1936, Serial No. 92,705

18 Claims. (Cl. 235—3)

This invention relates to the type of cash registers known as accounting machines, and more particularly to the type of accounting machines used by banking and similar institutions. This case is a division of applicants' pending application Serial No. 677,980, filed June 28, 1933.

The primary object of this invention is to provide a machine adapted for use by banking and similar institutions.

Other objects of the present invention are to provide means for automatically line-spacing the traveling carriage when certain transactions are being computed, and to furnish novel means for controlling the line-spacing means.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 1 is a perspective of the complete machine.

Fig. 2 is a side elevation showing in detail the mechanism for releasing the machine by means of the total keys.

Fig. 3 is an elevation of the right side frame showing the cycle control mechanism.

Fig. 4 is a detail view of the transfer mechanism for the auxiliary totalizer.

Fig. 5 is a cross section showing an amount bank and its associated differential mechanism.

Fig. 8 is a top plan view of the auxiliary totalizer and its differential mechanism.

Fig. 9 is a side elevation illustrating a part of the interlocking mechanism between the transaction banks, the total keys, and the machine releasing mechanism.

Fig. 10 is a detail view of part of the machine releasing mechanism.

Fig. 11 is a sectional view taken just to the right of an amount bank showing the mechanism for controlling the machine differentials in read and reset operations.

Fig. 12 is a side elevation as observed from the right, showing the differential latch mechanism for the first transaction bank, and the mechanism for automatically breaking said latch mechanism.

Fig. 13 is a detail view of the means for crippling part of the automatic latch-breaking mechanism when a key is depressed in the first transaction bank.

Fig. 14 is a side view depicting the manner in which the automatic latch-breaking mechanism is controlled by the third transaction bank.

Fig. 17 is a facsimile of a fragment of a ledger or account card illustrating one form of transaction which is possible with the present machine.

Fig. 18 is a facsimile of a fragment of another ledger card.

Fig. 19 is a facsimile of a portion of a proof card.

Fig. 20 is a front elevation of a portion of the printing mechanism.

Fig. 21 is a front elevation of the mechanism which automatically controls the line-spacing of the sliding table.

Fig. 22 is a front elevation of the sliding table or traveling carriage with which the present machine is equipped.

Fig. 23 is a fragmentary end view as observed from the right, showing the method of mounting the sliding table to the machine.

Fig. 24 is a front view of the sliding table showing, in a general way, the escapement mechanism.

Fig. 25 is a front view showing in detail the escapement mechanism and part of its controlling mechanism.

Fig. 26 is a detail view showing the escapement releasing mechanism in ineffective position.

Fig. 27 is a detail view showing the escapement releasing mechanism in effective position.

Fig. 28 is an end view of the controlling mechanism for the sliding table escapement mechanism.

Fig. 29 is a top view of part of the machine shown in Fig. 28.

Fig. 30 is a front view of a part of the mechanism shown in Fig. 28.

Fig. 31 is a top view of the operating yoke for the automatic line-spacing mechanism.

Fig. 32 is a detail view of a part of the mechanism shown in Fig. 29.

GENERAL DESCRIPTION

The present invention is embodied in a machine of the type illustrated and described in Letters Patent of the United States Nos. 1,619,796, 1,747,397, and 1,761,542 issued respectively March 1, 1927, February 18, 1930, and June 3, 1930, to B. M. Shipley, and the copending application of M. M. Goldberg, filed August 27, 1931, Serial No. 559,720.

Such mechanism of the present machine as is of standard construction, having been used in former machines, will be but briefly treated in both the general description and the detailed description to follow. However, reference may be had to the patents and application referred to above and hereinafter for a more detailed description of the mechanism not thoroughly treated herein.

The machine of the present invention, while shown embracing a system for use by building and loan associations, is very flexible in its nature and with slight alterations may be adapted for use by various other business institutions where debits and credits are constantly being made against old balances, and new balances arrived at.

The machine embodying this invention is also provided with a novel mechanism for automatically line-spacing the record cards and has novel means for controlling that automatic mechanism.

DETAILED DESCRIPTION

Operating mechanism

The machine of the present invention is preferably operated by means of the usual electric motor. Releasing the machine for operation automatically closes the electrical circuit and clutches the motor to the driving mechanism of the machine, from which it is automatically declutched after the machine has operated through the proper number of cycles. As this motor and clutch and releasing mechanism are of conventional design, they have not been illustrated herein and will not be further described. However, if further description is desired, reference may be had to Letters Patent of the United States No. 1,144,418 granted June 29, 1915, to Kettering and Chryst.

Figure 6:
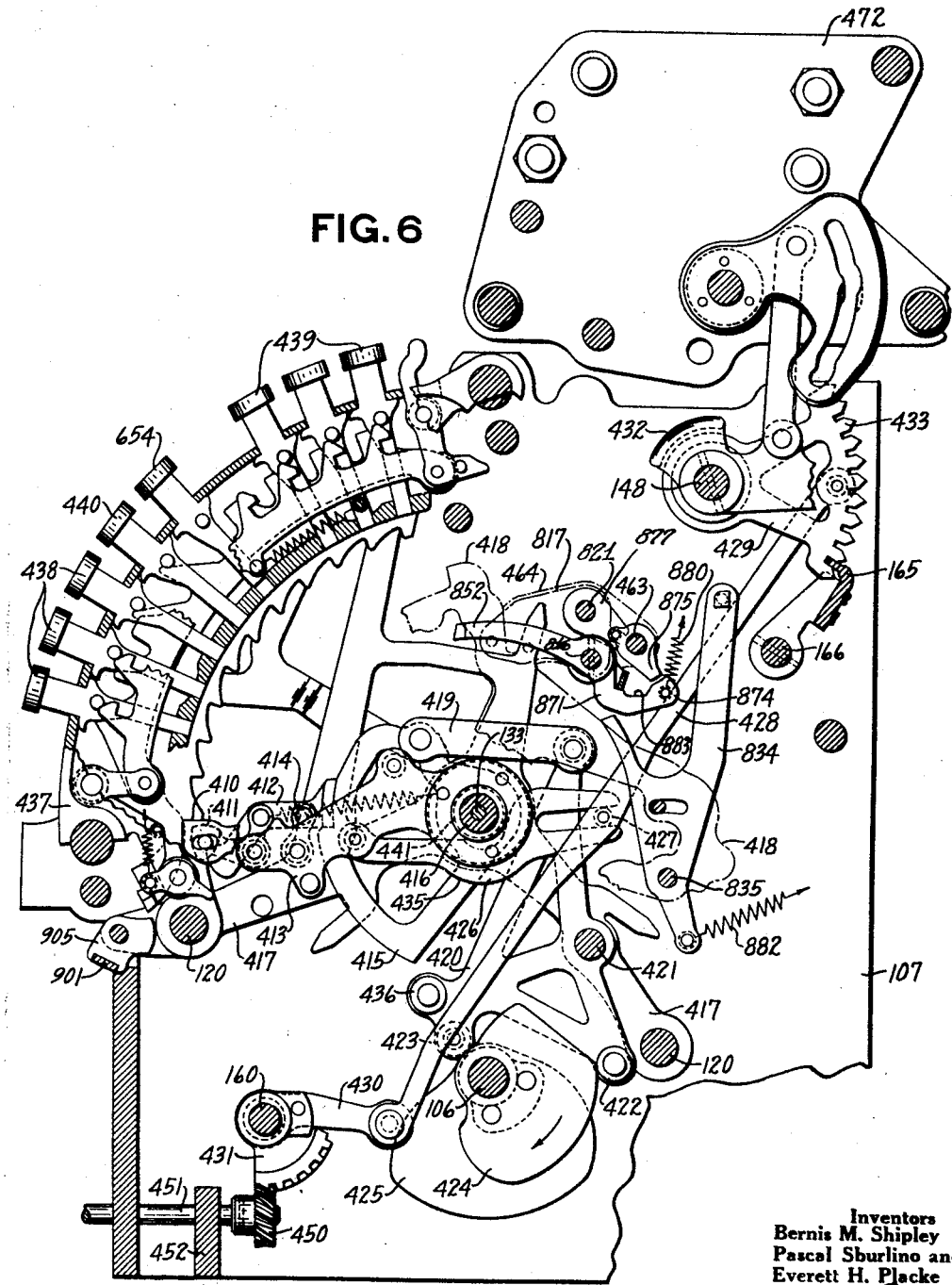
Fig. 6 is a sectional view of one of the transaction banks and its associated differential mechanism.

If desired, the machine may be hand-operated by means of a crank (not shown) connected to the right end of a shaft 100 (Fig. 3). Secured to the left end of the shaft 100 is a pinion 101 (Fig. 3) which cooperates with a gear 102 pivoted on a stud 103 secured in a main right frame 104. The gear 102 meshes with a gear 105 secured on the right-hand end of a main cam shaft 106, one end of which is journaled in the right frame 104, the other end being journaled in a left frame 107 (Fig. 6). The ledger frames 96 and 97 and the main frames 104 and 107, between which the bulk of the machine mechanism is supported, are mounted on a machine base 98 (Figs. 22 and 23). Depressing a starting bar 108 releases the shaft 106 for rotation. The machine may then be operated by means of the hand crank and its associated mechanism.

Secured on the right end of the shaft 106 (Fig. 3) is a cam 109 which cooperates with a roller 110 pivotally mounted on a lever 111 loose on a stud 112 secured in the frame 104. A strong spring 113 is tensioned to urge the lever 111 upward and, through the roller 110 and the cam 109, assist the shaft 106 to its home position after the clutch mechanism has been disengaged near the end of an operation. Further explanation of this operating mechanism is deemed unnecessary, as reference may be had to the previously mentioned patents if a more detailed description is desired.

Keyboard

For illustrative purposes let us assume that the present machine has been arranged for use by building and loan associations or similar banking institutions where individual records are kept of each member's account. Such accounts are frequently balanced, which includes the setting up of an old balance, the addition of credits to and the subtraction of debits from such old balance, and a new balance arrived at by ascertaining the result of the foregoing computations. With such a system in mind, let us examine the keyboard of this machine.

Amount keys

Calling attention to Figs. 1, 5, and 11, the machine as illustrated has nine amount banks 114, each containing nine amount keys 115. Each amount bank carries a zero stop lever 116, arranged to cooperate with the nose of a reset spider 117 loosely mounted on a hub 164 of a differential actuator 124, which in turn is pivoted on a hub 118 extending between two plates 119 (see also Fig. 8) supported by rods extending between the main frames 104 and 107 of the machine. The spider 117 has a notch 121 which embraces a stud 122 in the nose of a latch arm 123 pivoted on a differential actuator 124. Shiftably mounted on the actuator 124 by means of the arm 123 and another arm 125 is a latch 126. The arm 125 has a foot 127 arranged to cooperate with a notch in a driving segment 128 connected by a link 129 (Fig. 5) to a cam lever 130 loosely mounted on a stud carried by one of the plates 119. The cam lever 130 cooperates with companion cams 131 and 132 secured on the shaft 106.

In add operations, the shaft 106 makes one clockwise rotation, thereby rocking the lever 130 and the segments 128 first clockwise, as viewed in Fig. 5, then counter-clockwise to their normal positions. There is a differential actuator unit like that explained above for each amount bank, and each differential unit is supported between two of the plates 119. The entire assembly of differential units is held intact by means of a rod 133 extending through the hubs 118.

If no key is depressed in an amount bank, the zero stop lever engages the nose of the reset spider 117, forcing the foot 127 out of the notch in the segment 128 and forcing the nose of the latch 126 into one of a series of notches 134 in a plate 135 supported by one of the plates 119. This breaks the latch in the zero position. If one of the keys 115 is depressed in an amount bank, the differential actuator 124 travels clockwise until the latch 126 engages the stem of the depressed key, causing the latch to break in the proper position, thereby differentially setting the actuator. After the foot 127 is forced out of the notch in the segment 128, the segment is free to continue its clockwise movement and an arcuate surface 136 thereon engages the sole of the foot 127 to lock the actuator 124 in its set position. Return movement home of the segment 128 releases the latch 126 and returns the latch and actuator to normal position.

Transaction keys

The machine of the present invention has four totalizer lines, three lines of interspersed totalizers 138, 139, and 140 (Figs. 5 and 11), and an add-subtract or balance totalizer 141. The totalizer lines 138 and 139 each have nine sets of totalizer wheels, which are actuated by the differential actuators 124. The actuators 124 have three sets of teeth, one set for each of the totalizers 138 and 139 and a set for the add-subtract totalizer 141. The lines 138 and 139 are shiftable laterally in order that the desired set of totalizer wheels may be alined with the differential actuators 124. A row of keys 142 (Figs. 1 and 15) controls the selection of the totalizers on line 138 and a row of keys 143 controls the selection of the totalizer on line 139. The mechanism which shifts the totalizers laterally is old in the art and therefore will not be explained, but reference may be had to Patent No. 1,394,256 issued October 18, 1921, to F. L. Fuller for a detailed description of this mechanism.

The add-subtract or balance totalizer 141 has two sets of wheels, a positive set and a negative set. The keys 142, in addition to selecting the totalizers on line 138, also select the positive side of the add-subtract totalizer for engagement with the differential actuators, and the keys 143 likewise select the negative side of the balance totalizer for engagement with the differentials.

In add operations, after the segments 128 have reached the end of their movement clockwise, thereby setting the differential actuators 124 commensurate with the amount keys depressed, the selected set of totalizer wheels on one of the lines 138 or 139 (Fig. 5) and the proper side of the add-subtract totalizer are moved into engagement with the teeth on the differential actuators 124. The segments 128 then start their return movements, picking up all the differential actuators 124 and returning them to their home positions. This rotates the wheels of the selected totalizer commensurate with the amount set up on the keyboard. The totalizers are then disengaged from the differential actuators 124. The differential actuators 124 have incorporated therein the usual transferring mechanisms for adding one to the next higher order wheel when the lower order wheel passes from 9 to zero. These transfer mechanisms are old and will not be further explained here, as reference may be had to the patents referred to hereinbefore for a complete description thereof.

*Printer actuating mechanism*

Calling attention to Fig. 5, pivoted on each differential actuator 124 is a beam 144 bifurcated to embrace a stud 145 in a link 146. The link 146 exends between a toothed segment 147 loosely mounted on a shaft 148 pivoted between the main frames of the machine and an arm of a gear segment 149 loose on a shaft 160. The segment 149 cooperates with a gear 161 secured on a shaft 162, which cooperates with the well known printer rack mechanism to position the printer wheels in a manner now to be described.

The Y-shaped cam arm 130 (Fig. 5) has a roller 163 which cooperates with an arcuate surface on the beam 144 to force the beam against the hub 164 on the actuator 124 after said segment has been differentially positioned, as previously described. This, through the link 146, positions the segments 147 and 149 commensurate with the position of the differential actuator 124, thereby properly positioning the associated printing wheel. After the segment 147 has been positioned, an aliner 165 fast on a shaft 166 (Fig. 5) engages one of the tooth spaces therein to assist in alining the printing mechanism.

*Cycle control mechanism*

Calling attention to Fig. 3, in add operations the shaft 106 makes one revolution to operate the differential mechanism through one cycle of movement. In read and reset operations it is necessary that the differential mechanism operate through two cycles of movement. Therefore, it is necessary to rotate the shaft 106 two complete revolutions in such operations. This is accomplished by means of cycle control mechanism which controls the disengaging of the motors clutch in a manner now to be described.

Journaled between the main frames 104 and 107 is a key lock shaft 167 having secured on its right end an arm 168 carrying a stud 169 embraced by a slot in the upper end of a link 170 bifurcated on its lower end to receive a stud in a pitman 171 slotted to embrace the stud 103. The lower end of the pitman 171 is pivotally connected to an arm 172 journaled on a stud 173 carried by the frame 104. The arm 172 has an extension 174 connected by a link 175 to an arm 176 secured on a zero latch throwout shaft 177 (see also Fig. 9) extending through the machine and journaled in the main frames 104 and 107.

The link 170 has a stepped opening 178 which cooperates with a stud 179 in a cam arm 180 pivoted on the stud 173 (Fig. 3). The arm 180 carries a roller 181 which cooperates with a cam race 182 in the gear 102. The race 182 has diametrically opposed cam sections which cooperate with the roller 181 near the end of each cycle of movement to rock the arm 180 first clockwise, then back to normal position. Retained in a slot in the link 170 by means of a projection is a spring 183 operatively connected to the arm 168, which spring is compressed to urge the shaft 167 clockwise.

In Fig. 3 the cycle control mechanism is shown in its normal or adding position. Releasing the machine for an add operation by depressing the motor bar 108 frees the shaft 167 to the action of the spring 183, which forces the shaft clockwise until the arm 168 strikes a stop stud 184 secured in the frame 104. This movement of the shaft 167 engages the motor clutch and locks the amount keys in the well known manner.

As previously explained, the shaft 106 makes one revolution clockwise in add operations and the gear 102 makes one-half revolution counter-clockwise. Just as the gear 102 is completing its movement, the arm 180 is rocked clockwise and back, as previously explained, and as the stud 179 at this time engages the top step in the opening 178, the link 170 receives its maximum downward movement. This declutches the motor from the driving mechanism and releases the depressed keys in the usual manner.

In total taking operations, both read and reset, it is necessary that the shaft 106 make two clockwise revolutions and the gear 102 one counter-clockwise revolution. This is accomplished in the following manner. The pitman 171 carries a roll 185 normally retained in a notch in a cam 186 but adapted to cooperate at certain times with a race 187 in said cam 186. The cam 186 is rotatably supported by the stud 103, but during add operations is retained immovable by means of the roller 185 engaging the notch therein.

Figure 7:
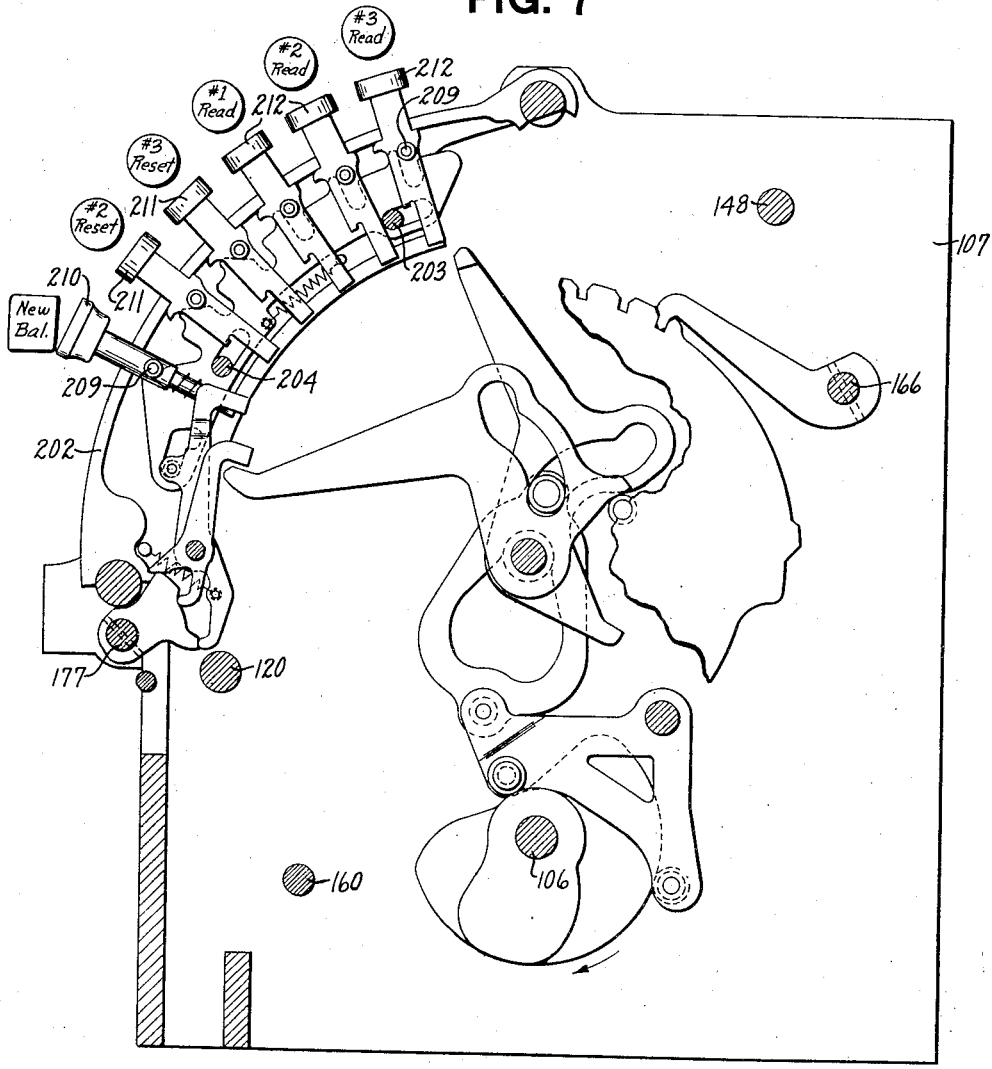
Fig. 7 is a cross section of the mechanism for positioning the total plate.

Loosely mounted on the shaft 167 (Figs. 3 and 9) is an arm 188, connected by a link 189 to the arm 172. The arm 188 has pivoted thereto a link 190 having a stud 191 which engages a slot in a plate 192 pivoted on a stud 193 secured in the frame 104. The link 190 has fast therein another stud 150 arranged to cooperate with a projection 151 on the arm 168. The plate 192 has another slot embracing a stud 194 in an arm 195 of a yoke 196 loose on a shaft 197 (see also Fig. 2). The yoke 196 is bifurcated to receive a stud 198 in a link 199 connecting the upper ends of key plates 200 and 201 mounted for slight radial movement on studs 203 and 204 carried by a total key frame 202 (Fig. 7).

A link 205 connects the lower ends of the plates 200 and 201 in exactly the same manner as the link 199 connects the upper ends. Each plate 200 and 201 has three sets of slots 206, 207, and 208 (Figs. 2 and 9) arranged to cooperate with studs 209 carried by a new balance key 210, total reset keys 211, and total read keys 212 (see also Fig. 7). These slots are so arranged that each plate 200 and 201 receives a varying degree of movement for each corresponding read and reset key depressed. However, the combined movement of both plates is always the same, and consequently the stud 198 moves the same distance regardless of which total key is depressed.

The arm 188 (Fig. 3) and connecting mechanism are retained in normal ineffective positions by a spring 213 tensioned between an extension of the arm 168 and one end of a lever 214 pivoted on a stud 215 secured in an auxiliary frame 216 supported by the frame 104. The lever 214 is connected by a link 217 to the arm 188. Thus the spring 213 retains the arm 188 in normal position against the stop stud 184 and at times when said arm and the shaft 167 are rotated in unison, their action is compensated for by the link 217 so that no additional burden is placed upon the shaft 167.

Depression of any of the keys 210, 211, or 212 (Fig. 7) moves the plates 200 and 201 (Figs. 2 and 9) downwardly, thereby rocking the yoke 196 counter-clockwise. This movement of the yoke 196, through the stud 194, rocks the plate 192 counter-clockwise and the link 190 clockwise to move the stud 150 in the path of the projection 151 on the arm 168. The yoke 196 (Figs. 2 and 9) has an arm 218 with a surface which cooperates with a stud 219 in an arm of a yoke 220 loose on the shaft 167. The yoke 220 has an arm 221 (Fig. 10) bifurcated to receive a stud 222 in a release pawl 223 on the shaft 197 and adapted to cooperate with a release arm 224 secured on the shaft 167. A spring 225 is tensioned to hold the pawl 223 in the path of the arm 224.

Rocking the yoke 196 counter-clockwise by depressing any of the total keys, as explained above, causes the arm 218, through the stud 219, to rock the yoke 220 clockwise. This in turn rocks the pawl 223 counter-clockwise to release the key lock shaft 167 to the action of the spring 183 (Fig. 3) as explained above. The clockwise releasing movement of the shaft 167 through the arm 168 rocks the arm 188 in unison therewith. This, through the link 189 and arm 172, gives the shaft 177 a slight movement clockwise and moves the pitman 171 forwardly, causing the roller 185 to move into the raceway 187 in the cam 186 and couple said cam to the gear 102 in the well known manner. This movement of the pitman 171 also rocks the link 170 clockwise.

During rotation of the gear 102 and consequent rotation of the cam 186 in unison therewith, the raceway in said cam 186 cooperating with the roller 185 gives the pitman 171 and shaft 177 added movement, thereby placing the link 170 in a position where the stud 179 is free to move idly in the long part of the opening 178 when the cam arm 180 is rocked by the raceway 182. This prevents restoring the key lock shaft 167 during the first cycle of operation, thereby allowing the machine to operate through another cycle, near the end of which the cam 186 moves the pitman 171 and link 170 to a position where the stud 179 will again engage the horizontal section of the opening 178 when the arm 180 is moved downwardly, which restores the key lock shaft 167 to normal position and releases the depressed transaction and total keys.

Add-subtract totalizer

The add-subtract totalizer embodied in this machine is similar to that used in previous machines of this type. There is an adding wheel and a subtracting wheel for each denominational unit (Figs. 4 and 5), corresponding wheels of each denominational unit being geared together in the well known manner so that they revolve in opposite directions. These sets of add-subtract totalizer wheels are loosely mounted on the shaft 141, which is in turn secured in a slidable frame (not shown) controlled for engagement with the differential actuators 124 in a manner to be later described in connection with the auxiliary totalizer. The add-subtract totalizer is selected for addition or subtraction by shifting the shaft 141 so that the desired set of wheels are alined with the differential actuators 124. This is accomplished by means of the first transaction bank latch plate 410 (Figs. 6, 12, and 14) which operates similarly to the reset spider 117 (Fig. 11) of the amount bank and through an arm 411 controls the breaking of a first transaction latch 412. The latch 412 is pivoted to an arm 413 by means of the arm 411 and a link 414 and has a foot which cooperates with a notch in a driving segment 415 pivoted on a hub 416 extending between plates 417 and 418 supported by the rods 120. Substantially all the mechanism of the first transaction bank is mounted between the plates 417 and 418 (Fig. 8). A link 419 connects the segment 415 to a cam arm 420 pivoted on a stud 421 carried by the plate 417. The lever 420 carries rollers 422 and 423 which cooperate with companion cams 424 and 425 secured to the shaft 106. The arm 413 is turnably mounted on the hub 416 and has pivoted thereto a beam 426 bifurcated to embrace a stud 427 in a link 428 extending between an alining segment 429 and an arm 430 of a printer drive segment 431 journaled on the shaft 160. The segment 429 is secured to a yoke 432 fast to the shaft 148. The segment 429 has a plurality of teeth 433 which cooperate with the alining bar 165 secured to the shaft 166.

Again directing attention to Fig. 6, the beam 426 has an arcuate surface 435 which cooperates with a roller 436 carried by the arm 420. A first transaction bank 437 has therein keys 438, 439, and 440. Depressing any of these keys places the lower end of the stem thereof in the path of the arm 411 to break the latch 412 and differentially position the latch plate 410 and arm 413 commensurate with the depressed key. There is also automatic means, to be explained later, for breaking the latch 412 in its zero, third, fifth, and sixth positions. Unlike the other banks of the machine, the first transaction bank has no zero stop pawl for breaking the latch 412 in its zero position. Consequently, when none of the keys in this bank are depressed and the automatic latch-breaking mechanism is ineffective, the latch plate 410 and arm 413 travel to the ninth position, where the latch is automatically broken by means of a stud carried by the first transaction bank frame engaging the end of the latch plate 410. After the plate 413 has been differentially positioned by one of the means previously described, the roller 436 engages the arcuate surface 435 of the beam 426, forcing said beam against a hub 441 to differentially position the segments 429 and 431 and the shaft 148 commensurate with the position of the arm 413. The segment 431 is geared to a pinion 450 fast on a shaft 451 journaled between a pinion frame 452 and a front printer frame 453 (see also Fig. 28). The shaft 451 drives a rack (not shown) which positions the printing wheels for the first transaction bank 437 and also controls the automatic line-spacing mechanism to be later described.

Secured to the left end of the shaft 148, and consequently rotated in unison therewith (Figs. 8 and 16), is an auxiliary totalizer shifting cam 442 having an arm 443 connected by a link 444 to an add-subtract totalizer shifting cam 445, pivoted on a stud not shown, carried by the left frame 107. The stud which supports the shifting cam 445 is on the same center as the differential actuators 124. The cam 445 moves in synchronous order with the cam 442, due to its connection thereto, and as the cam 442 is positioned by the latch mechanism of the first transaction bank, the cam 445 is likewise positioned according to the location of said first transaction bank latch mechanism. By referring to Fig. 16 it will be seen that both the cams 442 and 445 have ten positions. The four upper positions of the cam 445 shift the add-subtract totalizer frame to the right (as viewed in Fig. 8, or to the left as viewed in Fig. 16), thereby alining the plus set of totalizer wheels with the actuators 124. The four lower positions of the cam 445 shift the add-subtract totalizer frame to the left (Fig. 8) to aline the negative set of totalizer wheels with the actuators. The cam 445 has two neutral positions which retain both the positive and negative sets of totalizer wheels out of engagement with the differential actuators 124.

From the foregoing description it will be seen that when the latch 412 (Fig. 6) is broken in the zero, first, second, or third position, the negative side of the add-subtract totalizer will be selected for engagement with the actuators, and when the latch 412 is broken in the sixth, seventh, eighth, or ninth position, the positive side of the add-subtract totalizer will be selected for engagement with the differential actuators 124, and when the latch 412 is broken in the fourth or fifth position, neither set of totalizer wheels will be selected for engagement with the differentials.

As previously stated, the mechanism which shifts the totalizer lines 138, 139, and 141 laterally has been neither illustrated nor described in detail herein, as reference may be had to the Fuller Patent No. 1,394,256 for a complete description of this mechanism.

The means for engaging the add-subtract totalizer with the differential actuator 124 is so closely allied to the engaging mechanism for the auxiliary totalizer that it is deemed advisable to describe these mechanisms together in the following description of the auxiliary totalizer mechanism. The same is true of the reset shaft 316 (Fig. 11) for the add-subtract totalizer.

Auxiliary totalizer mechanism

Directing attention to Figs. 4, 5, and 8, the auxiliary totalizer mechanism is supported between the plate 216 and a left auxiliary plate 471 secured to the left frame 107. The plate 216 supports an intermediate plate 472 which also assists in supporting the auxiliary totalizer mechanism. The auxiliary totalizer 140 is similar in construction to the front and rear totalizers 138 and 139 and has six sets of interspersed totalizer wheels rotatably mounted on a tube 473 secured in arms 474 and 475, loose on an engaging shaft 476, the ends of which are supported in slots (not shown) in plates 479 and 480 of the usual type secured respectively to the plates 216 and 471. Secured on opposite ends of the shaft 476 are arms 481 and 482 carrying anti-friction rollers which extend within duplicate cam slots of the plates 479 and 480. The arm 475 (Fig. 8) carries a pin 486 upon which is journaled a flanged roller 487, the upper end of which is embraced by a lateral slot 488 in a bracket 489 secured to the plate 471. The lower end of the roller 487 extends within a slot 490 in the auxiliary shifting cam 442 (see also Fig. 16). Movement of the cam 442 shifts the auxiliary totalizer laterally to aline the selected set of totalizer wheels with a plurality of differential actuator segments 492. The auxiliary totalizer line is guided in its lateral movement by the slot 488 in the bracket 489 and by the shaft 476.

The present machine is equipped with nine amount banks and one overflow bank. Consequently there are ten of the differential actuators 124 (Fig. 5) and ten corresponding auxiliary actuator segments 492. Each of the segments 492 is rotatably supported by the shaft 148 in vertical alinement with its corresponding actuator 124. Corresponding actuators 124 and segments 492 are connected for concert movement by a link 493. Consequently the differential movement of the actuator 124, which is controlled in adding operations by the amount keys 113, is transmitted to the auxiliary actuator segments 492.

Automatic latch-breaking mechanism

The latch of the first transaction bank, in addition to being broken by means of the keys 438, 439, and 440 (Figs. 6 and 15), is also broken automatically in various positions. It will be remembered that the first transaction bank latch controls the selection of the plus or minus side of the add-subtract totalizer and also controls the selection of the different totalizers on the auxiliary totalizer line in all operations including add, read, and reset.

The first transaction bank (row 1) latch has ten positions, zero to 9 inclusive. Movement of this latch controls the positioning of the cams 442 and 445 (Fig. 16) which in turn respectively control the selection of different sets of totalizer wheels on the auxiliary totalizer line and the plus or minus side of the add-subtract or balance totalizer. Positions zero to 3 inclusive of the cam 445 select the minus side of the add-subtract totalizer and positions 6 to 9 inclusive select the plus side of the add-subtract totalizer.

It requires two positions of the cam 445, in this instance positions 4 and 5, for the shifting of the add-subtract totalizer in order to aline the positive or negative side thereof with the actuators. There are keys in both these positions, but the account number key, fourth position, is merely a printing key, that is, it is used to release the key lock line when it is desired to print an account number on the ledger card or passbook. The proof key, fifth position, has a short stem and consequently does not stop the latch which is, in this position, controlled automatically. The automatic latch-breaking mechanism will now be described in detail.

Figure 15:
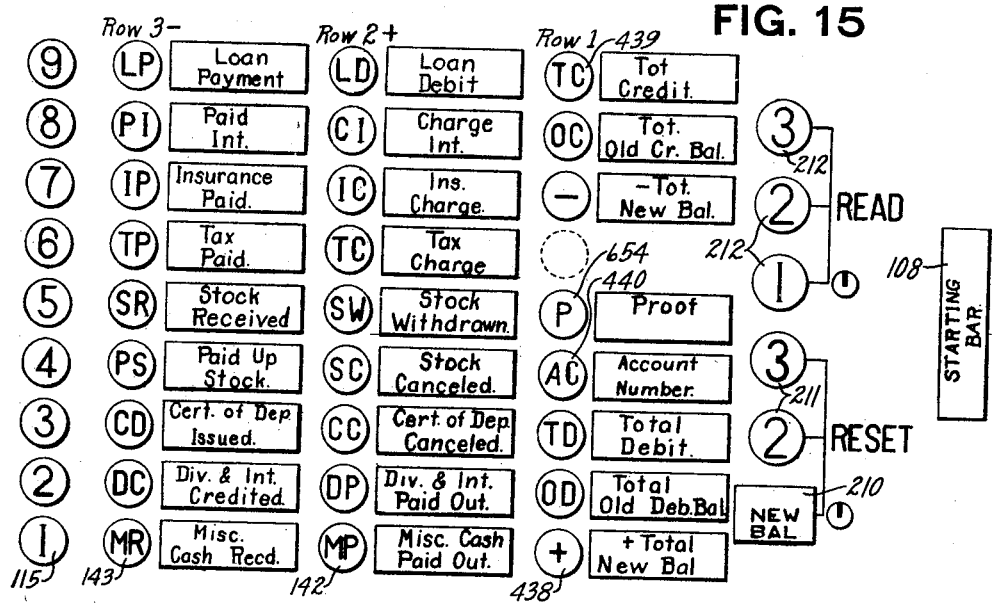
Fig. 15 is a diagrammatic view showing one amount bank, the three transaction banks, the total plate control keys, and the starting bar of the present machine.

Mounted for slight rocking movement on studs 203 and 204, carried by the total key frame 202 (Figs. 7 and 14) is a plate 808 having slots 809 and 810, which cooperate with studs 209 in the new balance or first reset key 210 and the first read key 212 (see also Fig. 15). The plate 808 is bifurcated to embrace a stud 811 in an arm 812 loosely mounted on the upper reset shaft 197. The arm 812 has a hook 813 which cooperates with a square stud 814 in one arm of a yoke 815 loosely mounted on a shaft 816, opposite ends of which are journaled in the plate 464 (Figs. 6 and 8) and a plate 817, carried by the first transaction bank hanger 418. The plate 808 (Fig. 14) has symmetrical slots 818, which cooperate with the studs 209 carried by the second and third reset and read keys 211 and 212 respectively. The arm 812 carries a stud 819 which cooperates with an arm 820 secured on a shaft 821 journaled in the plates 464 and 817. Secured on the shaft 821 is another arm 822 having a stud 823 which cooperates with an arm 824 loose on the shaft 197. The arm 824 carries a stud 825 arranged to engage a key lock line latch 826 loose on the shaft 197.

When the machine is in home position, a spring (not shown) retains the latch 826 in engagement with an arm 827 fast on the key lock shaft 167.

Depressing any one of the keys 210, 211, and 212 rocks the plate 808 and the arm 812 counter-clockwise. This in turn rocks the shaft 821 and arm 822 clockwise, which, through the arm 824, moves the latch 826 counter-clockwise to release the key lock line for its clockwise releasing movement, as previously described herein. Restoration counter-clockwise of the key lock line 167 near the end of machine operation allows the latch 826 to reengage the arm 827 to lock the shaft 167 against releasing.

Depressing a key in either the first, second, or third transaction bank likewise rocks the latch 826 counter-clockwise, so that the shaft 167 will be free to make its releasing movement clockwise when the starting bar 108 is depressed. From the foregoing it will be seen that depressing one of the keys 210, 211, or 212 releases the machine for operation, but before the machine can be released by depressing the starting bar 108 it is necessary that a key be depressed in either the first, second, or third transaction bank.

Depression of either the new balance key 210 (Fig. 15) or the first read key 212, due to the angle of the slots 809 and 810 (Fig. 14), rocks the plate 808 and the arm 812 full distance counter-clockwise. This moves the hook 813 out of the path of the stud 814, thereby surrendering the yoke 815 to the control of other means to be later described. Depression of any other key in the total bank rocks the plate 808 and the arm 812 only partial distance counter-clockwise, which is not sufficient to move the hook 813 out of the path of stud 814; therefore the yoke 815 is retained in ineffective position.

The arm 812 (Figs. 12 and 14) has a stud 828 which cooperates with a forked projection of a yoke 829 loose on the shaft 821. An arm of the yoke 829 has steps 830, 831, and 832 which cooperate with a stud 833 carried by an upward extension of a latch stop arm 834 pivoted on a stud 835 carried by the hanger plate 418 for the first transaction bank (see Fig. 6). The arm 834 has a projection 836, which coacts with a projection 837 on the first transaction bank latch plate 410.

Depressing either the new balance key 210 or the first read key 212, through the plate 808 (Figs. 14 and 15) and the arm 812, rocks the yoke 829 maximum distance clockwise to aline the step 832 thereon with the stud 833 in the arm 834. Depressing any other key in the total bank rocks the yoke 829 part distance clockwise to aline the step 831 thereon with the stud 833 in the arm 834. The purpose of the above movements of the yoke 829 will be revealed later.

Calling attention to Fig. 12, fast on the key lock shaft 167 is an arm 838 connected by a link 840 to a plate 841, rotatably mounted on the shaft 821. A foot 842 of the link 840 cooperates with the stud 833 to restore the arm 834 to normal position near the end of each machine operation in a manner to be described later. The plate 841 has an arcuate surface 843 which coacts with a stud 844 carried by one arm of a yoke 845 turnably mounted on the shaft 816. Initial releasing movement clockwise of the shaft 167 (Fig. 12) rocks the foot 842 of the link 840 away from the stud 833 in the arm 834, and rocks the plate 841 counter-clockwise. This movement of the plate 841 disengages the arcuate surface 843 thereon from the stud 844 in the yoke 845 for a purpose to be later described. The yoke 845 has an extension 846 (Fig. 12) which cooperates with a stud 847 in an arm 848 of the yoke 815. Another extension 849 (Fig. 14) of the yoke 845 coacts with a stud 850 in an arm 851 secured to the shaft 816. Secured on the shaft 816 is a latch stop pawl 852 (Fig. 14), the end of which is adapted to cooperate with a projection 853 on the plate 410. Also fast on the shaft 816 is an arm 854 carrying a stud 855 which coacts with a projection 856 (Fig. 14) of a plate 857 mounted for slight rocking movement on the center 133. The plate 857 has angular camming surfaces 858 arranged to be engaged by studs 859 carried by the keys 143 (Fig. 15) of the third transaction bank. The stud 847 in the arm 848 of the yoke 815 (Fig. 12) is arranged to be engaged by a radial projection 860 on a plate 861 turnably mounted on the center 133 and having angular camming surfaces 862 which cooperate with studs 863 carried by the keys 438, 439, and 440 of the first transaction bank. The plate 861 (Figs. 12 and 13) carries a stud 864 embraced by the bifurcated end of an arm 865 rotatably supported on the shaft 821, and having an extension 866 which cooperates with the stud 833 carried by the stop arm 834 in a manner and for a purpose to be later described. The plates 857 and 861 (Figs. 12 and 14) are returned to and retained in normal positions as here shown against stop studs 867 and 868 secured in the hanger plates 417 by springs 869 and 870 respectively.

Loose on the shaft 816 is a pawl 871 (Fig. 6) which cooperates with steps 872 and 873 of a plate 805 secured to the first transaction bank latch plate 410.

The pawl 871 has an extension 874 which cooperates with a disabling arm 875 loose on the overdraft shaft 463. The arm 875 has a stud 876 embraced by the bifurcated end of an arm 877 loose on the shaft 821. The extension 874 of the pawl 871 is maintained in engagement with the connecting bar of the yoke 815 by a spring 880 which is tensioned to urge both the pawl 871 and yoke 815 in a counter-clockwise direction, as viewed in Fig. 6. A spring 881 (Fig. 14) is tensioned to urge the arm 851, shaft 816, arm 854, and pawl 852 counter-clockwise.

New balance and No. 1 read operations

In analyzing the different operations in which the first transaction bank latch is automatically broken, let us begin with the new balance or first reset operation and the first reading operation. Depression of either the new balance key 210 or the first read key 212 (Figs. 7 and 14) causes the stud 209, in cooperation with either of the slots 809 or 810 to rock the plate 808 and arm 812 counter-clockwise maximum distance. This, as previously explained, removes the latch 826 from the arm 827 and also rocks the hook 813 out of the path of the stud 814 in the yoke 815. This counter-clockwise movement of the arm 812 (Figs. 12 and 14) also rocks the yoke 829 full distance clockwise to disengage the step 830 from the stud 833 to release the arm 834 to the action of a spring 882, which is tensioned to rock said arm counter-clockwise. Clockwise movement of the yoke 829 also alines the step 832 with the stud 833.

Depression of either the new balance or first read key releases the key lock shaft 167 to the action of its spring, which rocks said shaft clockwise to clutch the motor to the driving mechanism, as explained earlier herein. Clockwise movement of the shaft 167 and the arm 838 moves the foot 842 of the link 840 out of the path of the stud 833, allowing the arm 834 to move clockwise until the stud 833 engages the step 832. With the arm 834 in this position the projection 836 is moved beyond the projection 837. Consequently said projection 837 passes above the projection 836 when the latch plate 410 makes its clockwise starting movement. The link 840 rotates the plate 841 counter-clockwise to free the yoke 845 for counter-clockwise movement, which in turn frees the yoke 815 and shaft 816 for counter-clockwise movement against which they are normally restrained by extensions 846 and 849 (Figs. 12 and 14) of the yoke 845 until the key lock shaft 167 makes its initial releasing movement clockwise. However, in this type of operation the shaft 816 is further blocked against counter-clockwise movement by the projection 856 (Fig. 14) of the plate 857. Consequently the pawl 852 is held ineffective and the pawl 871 is released to the control of the overdraft shaft 463.

When the add-subtract totalizer is not overdrawn, the shaft 463 is so positioned that the arm 875 engages the extension 874 to locate the pawl 871 in alinement with the step 873, which arrests the clockwise setting movement of the plate 410 to break the first transaction bank latch 412 in the sixth position. It should be borne in mind that in first read or reset operations the first transaction bank latch is always broken in either zero or the sixth position. Consequently the projection 836 (Fig. 12) of the arm 834 does not interfere with the latch plate 410.

With the wheels of the add-subtract totalizer standing at zero, let us assume that a transaction is made whereby "one" is subtracted from the totalizer, thereby causing an overdraft. This revolves the highest order plus wheel, which rocks the shaft 463 and arm 875 clockwise, moving said arm out of the path of the extension 874 and into alinement with an undercut surface 883 of the pawl 871. With the add-subtract totalizer thus overdrawn, a subsequent first reset or reading operation allows the pawl 871 to travel the full distance counter-clockwise until arrested by the arm 875 engaging the surface 883. This alines the pawl 871 with the step 872 of the plate 410, which corresponds to the zero position of said plate; consequently the first transaction bank latch is automatically broken in the zero position.

Figure 16:
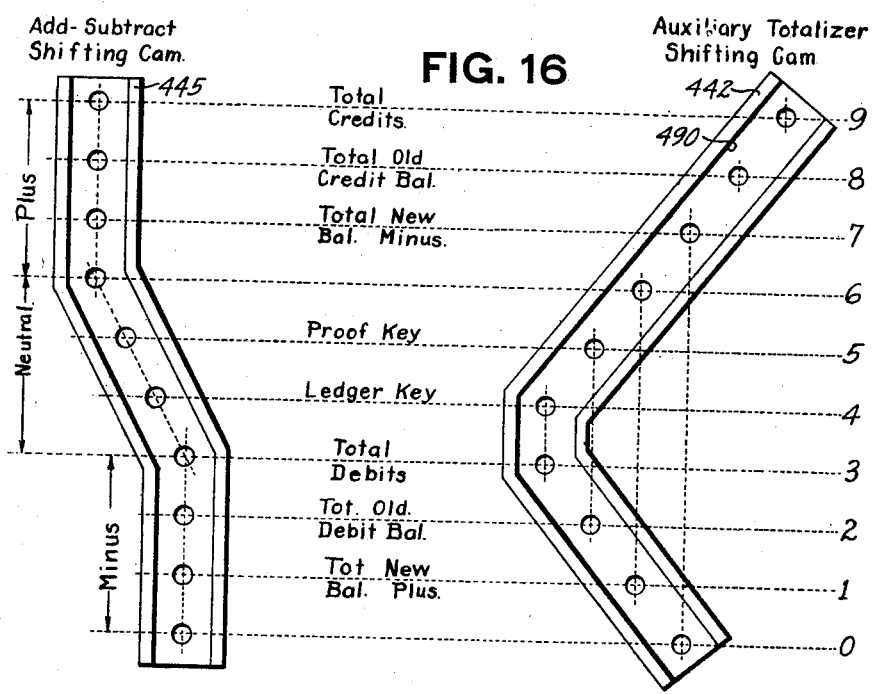
Fig. 16 is a diagrammatic view of the balance totalizer shifting cam and the auxiliary totalizer shifting cam. The cams are shown as they appear looking from the rear of the machine.

By referring to Fig. 16 it will be seen that when the first transaction bank latch is thus broken, the minus side of the add-subtract totalizer is selected for reading or resetting, and the totalizer on the auxiliary totalizer line, in which the total new balance is stored, is selected for addition. One exception to the above statement, however, is that when the #1 read key is depressed and an operation performed, the auxiliary totalizer engaging mechanism is shifted to a neutral position and the auxiliary totalizer consequently remains inoperative during a first reading operation.

Reading and resetting the auxiliary totalizer

The keys 438 and 439 (Figs. 6 and 15) in the first transaction bank represent the different totalizers on the auxiliary totalizer line; therefore, when it is desired to read or reset the auxiliary totalizer line, these keys are used in conjunction with the new balance or first reset key and the first read key. Using the keys 438 and 439 in conjunction with the new balance key causes the totalizers they represent on the auxiliary totalizer line to be cleared and this amount transferred to the add-subtract totalizer. In this type of transaction it is desirable that the automatic latch breaking mechanism be crippled in order that the stem of the depressed key will position the first transaction bank latch, thereby selecting the totalizer it represents. This is accomplished in the following manner:

Depressing any one of the keys 438 or 439 (Figs. 12 and 13) rocks the plate 861 counter-clockwise, causing the arcuate projection 860 to pass under the stud 847 in the yoke 815, thereby blocking the counter-clockwise movement of said yoke when it is released by depressing the first reset key 210 (Figs. 9 and 14), as explained above. Counter-clockwise movement of the plate 861 rocks the arm 865 clockwise to move the projection 866 in the path of the stud 833, thereby blocking counter-clockwise movement of the arm 834 when the first reset key 210 is depressed. As no keys have been pressed in the third transaction bank (Fig. 14), the projection 856 on the plate 857 remains in the path of the stud 855 to block counter-clockwise movement of the shaft 816. Therefore, it will be seen that the pawls 852 and 871 (Fig. 3) and the arm 834 (Fig. 12) are retained in ineffective positions, thereby allowing the latch plate 410 to travel until it strikes the stem of the depressed key.

Using the No. 1 read key 212 (Figs. 6, 7, and 15) in conjunction with the keys 438 and 439 disables the automatic latch breaking mechanism in exactly the same manner as just described, in order to read the desired totalizer on the auxiliary totalizer line.

Reading and resetting the No. 2 or rear totalizer line

To read or reset the No. 2 totalizer line, which is sometimes referred to as the rear totalizer, the keys 142 (Fig. 15) in the second transaction bank are used in conjunction with the No. 2 read key 212 or the No. 2 reset key 211. The keys 142 have no effect on the automatic latch-breaking mechanism, consequently this mechanism is controlled entirely by the No. 2 read and No. 2 reset keys. Depressing either of these keys rocks the plate 808 (Fig. 14) sufficiently to release the latch 826, but not far enough to disengage the hook 813 from the stud 814. Therefore the yoke 815 and likewise the pawl 871 (Fig. 6) are retained in ineffective position. This part movement of the plate 808, through the arm 812, rocks the yoke 829 (Figs. 12 and 14) sufficiently to aline the step 831 with the stud 833. This causes the arm 834 to be so positioned that the projection 836 is in the path of the projection 837 of the plate 410. This causes the clockwise movement of the plate 410 to be arrested and the first transaction bank latch broken in the fifth position, which, as previously stated, is a neutral position and selects neither side of the add-subtract totalizer.

Reading and resetting the No. 3 or front totalizer line

To read or reset the No. 3 or front totalizer line, the keys 143 (Fig. 15) are used in conjunction with the No. 3 read key 212 or the No. 3 reset key 211. Depression of any one of the keys 143 rocks the plate 857 (Fig. 14) counter-clockwise, thereby removing the projection 856 out of the path of the stud 855, which releases the shaft 816 for counter-clockwise movement when the machine is tripped. This places the pawl 852 in the path of the projection 853 on the plate 410, thereby causing the first transaction bank latch to be broken in the third position, but, as it is necessary that this latch be broken in the fifth position at this time, means have been provided for arresting the counter-clockwise movement of the shaft 816. Depressing either the third read or third reset key rocks the plate 808, the arm 812, and the yoke 829 part distance the same as depressing the second read or second reset key. Clockwise movement of the yoke 829 in addition to alining the step 831 with the stud 833 carried by the arm 834 causes an extension 884 to move into the path of the stud 855 to effectively block the counter-clockwise movement of the shaft 816 and the pawl 852. From the foregoing it will be seen that depressing the third read or third reset key releases the key lock shaft 167, thereby allowing the stud 833 (Fig. 12) to engage the step 831 of the yoke 829 to aline the projection 836 of the arm 834 with the projection 837 of the plate 410. Consequently the first transaction bank latch will be broken in the fifth position, thereby crippling the engaging mechanism for the add-subtract and the auxiliary totalizers.

It will be recalled that near the end of each machine operation the key lock shaft 167 (Fig. 12) is rocked counter-clockwise to release the depressed keys and disengage the clutch mechanism. This counter-clockwise movement, through the arm 838 and the link 840, rocks the plate 841 clockwise, causing the arcuate surface 843 to engage the stud 844 to rock the yoke 845 clockwise, which, through the extensions 846 and 849 (Figs. 12 and 14), also rocks the yoke 815 and shaft 816 clockwise to restore and retain them in their normal ineffective positions. This counter-clockwise restoring movement of the shaft 167 (Fig. 12) also causes the foot 842 of the link 840 to engage the stud 833 to return the arm 834 to its normal position as shown in Fig. 12. A spring 885 (Fig. 14) then returns the yoke 829 counter-clockwise to normal position, causing the surface 830, in cooperation with the stud 833, to retain the arm 834 in its normal position.

It will be remembered that the proof key 654 (Figs. 12 and 15), due to its short stem, does not break the first transaction bank latch mechanism. Neither does depression of this key move the plate 861, due to the fact that there is no camming surface 862 for the stud 863 carried by this key. In other words the sole purpose of the key 654, as previously brought out, is to prevent the transferring of the amount from the add-subtract totalizer into the auxiliary totalizer. Therefore, using the key 654 in conjunction with the new balance key 210 or first read key 212 resets or reads the balance totalizer, as the case may be, but does not transfer the amount into the auxiliary totalizer. The new balance key and the first read key work at this time in exactly the same manner as previously described for a new balance operation.

Control of the first transaction bank latch mechanism in adding operations

Adding operations are performed in the present machine by using the amount keys 114 (Fig. 15) in conjunction with the keys 438 or 439 in row 1, the keys 142 in row 2, or the keys 143 in row 3, together with the starting bar 108. Pressing any one of the keys 438 or 439 (Fig. 12) rocks the plate 861 counter-clockwise to block the counter-clockwise movement of the yoke 815 and the pawl 871, and, due to the fact that there are no keys depressed in the third row, the plate 857 (Fig. 14) blocks the counter-clockwise movement of the shaft 816 and the pawl 852. As no total key is depressed in an adding transaction, the hook 813 (Fig. 12) of the arm 812 further blocks the downward movement of the yoke 815 and the yoke 829 retains the arm 834 in its ineffective position. Consequently the first transaction bank latch is positioned by the depressed key 438 or 439 to select the proper totalizer on the auxiliary line for addition and the corresponding side of the add-subtract totalizer.

The keys 142 (Fig. 15) in row 2 have no effect on either of the plates 861 or 857 (Figs. 12 and 14). Neither is there a plate similar to these plates for this row of keys. As in the previous operation, the plate 857 retains the shaft 816 and the pawl 851 in ineffective position, as shown in Fig. 14, and as there are no total keys depressed at this time, the hook 813 on the arm 812 prevents downward movement of the yoke 815 and the pawl 871, and, as before, the yoke 829 blocks the movement of the arm 834. This renders all the automatic latch-breaking mechanism ineffective, and as there is no means for breaking the first transaction bank latch at zero, other than the automatic latch-breaking means, the plate 410 is free to travel to the ninth position to select the plus side of the add-subtract totalizer and the proper totalizer on the auxiliary totalizer line for the storing of credit items.

Using the keys 143 (Fig. 15) in row 3, in addition to selecting the totalizer on the front totalizer line for the addition of debit items, also rocks the plate 857 (Fig. 14) counter-clockwise to remove the projection 856 from the path of the stud 855, thereby permitting counter-clockwise movement of the shaft 816 and the pawl 852 when the machine is released for operation.

Again no total key is depressed, consequently the hook 813 and the yoke 829 prevent counter-clockwise movement of the yoke 815 and the arm 834 respectively. As the yoke 829 (Fig. 14) receives no movement, the extension 884 remains in the position here shown, and consequently does not interfere with the downward movement of the pawl 852. Releasing the machine for operation allows the pawl 852 to move into the path of the projection 853 to break the latch of the first transaction bank in the third position, thereby selecting the minus side of the add-subtract totalizer and the proper totalizer on the auxiliary totalizer line for the storing of debit items.

At the end of this specification a system will be outlined in which the various functions of the machine will be related in sequential order.

Printing mechanism

Only as much of the printing mechanism has been shown herein as was thought necessary to properly disclose the present invention. This invention is particularly concerned with the sliding table or traveling carriage mechanism and has to do with the automatic line-spacing of said table. Therefore, the following description will be confined principally to the automatic line-spacing mechanism.

The bulk of the printing mechanism used in this machine is old, having been disclosed in former patents, two of which are United States Patent No. 1,747,397 granted to B. M. Shipley February 18, 1930, and the Shipley Patent No. 1,761,542, referred to near the beginning of this specification, to which reference may be had for a thorough disclosure and description of the standard printing mechanism.

Referring to Figs. 22 and 23, a traveling carriage or sliding table 920 is mounted for lateral movement on an ejector shaft 921 supported by brackets 922, one only here shown, secured to the machine base 98, and by rollers 923 and 924 carried by a U-shaped bracket 925 secured to said sliding table cooperating with a rail 926 secured to the machine base 98. The table 920 supports a plurality of depressible keys 927 having notches 928 which cooperate with slots 929 in a slidable detent 930 mounted for slight lateral movement on studs secured in a plate carried by the table 920. A spring 931 is tensioned to urge the detent 930 toward the right. This locks the depressed key until another key is depressed, or until the detent 930 is automatically moved toward the left. This latter occurs near the end of each machine operation in the present machine. Each of the keys 927 has a spring 932 which returns said keys 927 to and retains them in their normal positions when they are released.

The lower ends of the keys 927 are tapered to cooperate with hinged plates 933 and 934 rotatably supported by upright extensions 935 (only one here shown) of a bracket 936 mounted for slight horizontal movement on studs 937 secured in a plate 938 fast to the base 98. The plates 933 and 934 are retained upward against the head of a stud 939 fast in the bracket 936 by a spring 940 which is tensioned between said hinged plates. The bracket 936 has a down-turned ear 941 maintained between two springs 942 by a screw 943 adjustably supported by nuts 944 on a bracket 945 secured to the plate 938. The screw 943 extends through a clearance hole in the ear 941.

The normal position of the sliding table 920 is at the extreme left, just opposite to that shown in Fig. 22. However, it will be observed that the plates 933 and 934, which form a locating stop for the sliding table, may be approached from either direction.

The keys 927 are line-finding keys and in the present machine there are twenty-seven of these keys, each of which corresponds to a space on ledger cards 946 and 947 (Figs. 17 and 18) and a proof card 948 (Fig. 19). These cards are arranged to be inserted within guides 949 (Fig. 23) (only one here shown) carried by the table 920. The key 927 corresponding to the line upon which it is desired to print is first depressed. This is done usually with the carriage 920 in its extreme lefthand position. The sliding table 920 is then pushed toward the right. The stem of the depressed key, which in the case of the ledger card 946 would be the seventh, engages the top surface of the inclined hinged plate 934, rocking said plate clockwise against the tension of the spring 940. The plate 933 serves as a stop for the lower end of the depressed key, and, as soon as the key stem passes over the plate 934, the spring 940 returns said plate upward to its normal position to secure the sliding table 920 in its adjusted position until the depressed key is released. The springs 942 cushion the shock and prevent injury to the key stem when the movement of the sliding table 920 is stopped by one of the plates 933 or 934. This locates the desired line on the ledger card in relation to a line of type wheels 949 (Fig. 20) loose on a rod 950 fast in a rear printer frame 951 (Figs. 6 and 7). There is a duplicate line of type wheels 952 loose on a rod 953 also carried by the printer frame 951 for printing on a detail strip 954 (Fig. 20) upon which is retained a complete record of the transactions for a certain business period. In the present machine each of the rods 950 and 953 carries four sets of amount type wheels, each set having nine wheels. In addition there is a set of date wheels, a set of transaction wheels, and a set of six ledger number wheels on each type wheel line. A common driving means actuates corresponding sets of wheels of the two lines, and there is a set of hammers 955 for the lower type line and 956 for the upper line of type wheels. All the mechanism shown in Fig. 20 is of conventional design and is fully described in the Shipley patents referred to in connection with the printing mechanism. Therefore it is thought unnecessary to further explain this mechanism.

Automatic line-spacing mechanism

It will be noted, by referring to Figs. 17 and 18, that there are seven vertical columns on each ledger card, namely, a date column, an old balance column, a debit column, a credit column, a new balance column, a transaction column, and an account number column. In this machine, debits and credits are never printed on the same line; however, any other combination of transactions is printed on the same line. For example, an old balance, a debit, and a new balance are printed upon the same line. Likewise, an old balance, a credit, and a new balance transaction are all printed upon the same line. This automatic line-spacing mechanism and the manner in which it is controlled by the first transaction bank will now be described in detail.

The first transaction bank printer pinion line 451 (Fig. 21) has fast thereon a disk 957 having notches 958 and 959 which cooperate with an extension 960 of an arm 961 loose on a hammer control shaft 962 journaled between the printer frames 453 and 951 (Fig. 28). The hammer control shaft is rocked slightly clockwise in each machine operation in the usual manner. The arm 961 has a projection 963 adapted to be engaged by a stud 964 fast in an arm 965 secured to the shaft 962. The arm 961 has an extension 966 to which is pivoted one end of a link 967, the other end of which is loosely connected to a shifting pawl 968 (Figs. 29 and 31) turnably mounted on a stud 969 fast in the base plate 98. The pawl 968 has a projection 970 which cooperates with an arm 971 secured to a rod 972 shiftably supported by a bracket 973 secured to the frame 453 and by a sub-frame 974 secured to the frame 951 (Fig. 28). The rear end of the rod 972 is pivotally connected to one arm of a lever 975 turnably supported by a stud 976 carried by the sub-frame 974. Another arm of the lever 975 has a camming surface 977 adapted to coact with a stud 978 in an arm 979 secured to the zero latch throw-out shaft 177.

Journaled in the frames 951 and 453 is a shaft 980 having loose thereon a yoke 981 slotted to receive the arm 971 (see also Fig. 30). An arm 982 (Figs. 28 and 29) of the yoke 981 is bifurcated to embrace a stud 983 fast in a lever 984 pivoted on a bracket 985 secured to the base plate 98. The arm 984 has a projection 986 (Figs. 24 and 25) which cooperates with one arm of a bell crank 987 loose on a stud 988 secured in the bracket 985. A link 989 pivotally connects the bell crank 987 to an escapement plate 990 turnably mounted on a stud 991 secured in a bracket 992 fast to the base plate 98. Pivoted on a stud 993 carried by the plate 990 is an escapement pawl 994 having a projection 995 which is maintained against a stop stud 996, fast in the escapement plate 990, by a torsion spring 997 supported by a stud 998 fast in the bracket 992. The stud 998 also forms the connection between the link 989 and the plate 990. Pivoted on the stud 991 is an escapement pawl 999, a projection of which is urged counter-clockwise by the spring 997 against a stop stud 1000 carried by the plate 990. The pawls 994 and 999 have respectively teeth 1001 and 1002 which cooperate with a plurality of teeth 1003 on a rack 1004 secured to the bracket 925 (see also Fig. 23) which supports the table 920. A spring 1005 is tensioned to urge the plate 990 (Fig. 25) counter-clockwise, which normally maintains the tooth 1002 of the pawl 999 in engagement with the teeth of the rack 1004.

Secured to the shaft 451 is a mutilated disk 1006 having depressions 1007 and 1008 which correspond respectively to the zero and sixth positions of the first transaction bank latch and cooperate with a stud 1009 in an arm 1010 loose on the shaft 962. The arm 1010 is bifurcated to embrace a stud 1011 in a bell crank 1012 loose on a shaft 1013 supported by the frames 453 and 951. The bell crank 1012 has fast therein a stud 1014 embraced by a slot in an arm 1015 secured to a shaft 1016 rotatably supported by the bracket 992. Secured to the shaft 1016 is another arm 1017 carrying a stud 1018 (Fig. 26) which cooperates with a lever 1019 pivoted on a shifting plate 1020 mounted for slight reciprocating movement on studs 1021 secured in the bracket 992. The plate 1020 has an angular camming surface 1022 which cooperates with a stud 1023 carried by the escapement pawl 999 (see also Figs. 26 and 27).

Calling attention to Figs. 15 and 17, let us assume that the ledger card 946 has been properly inserted within the guides of the sliding table and the first space thereon located opposite the printing point by depressing the No. 1 line finding key and moving the sliding table 920 to the right until the stem of the depressed key is engaged and retained by the stop plates 933 and 934 in the manner set out hereinbefore. An old balance of $5,000.00 is set up on the amount keys, the total old credit balance key is depressed in row 1, and the machine is released for operation by depressing the starting bar 108. In this case the old credit balance key controls the first transaction bank latch, causing it to break in the eighth position. Consequently the periphery of the disk 957 (Fig. 21) is in the path of the extension 960 and retains the arm 961 in its normal ineffective position, the arm 965 in this case rocking idly back and forth.

At the end of this first operation the plate 930 (Fig. 22) is shifted towards the left, as explained in Shipley Patent No. 1,761,542, to release the depressed line finding key and to surrender control of the table 920 to the escapement mechanism.

Next, a credit item of $150.00 is entered on the ledger card by depressing one of the keys in row 2 and releasing the machine for operation by depressing the starting bar 108. As previously brought out, pressing any one of the keys in row 2 causes the first transaction bank latch to be automatically broken in its ninth position. This positions the shaft 451 (Fig. 21) and the disk 957 so that the notch 959 is opposite the extension 960 of the arm 961. Immediately after the disk 957 is positioned, the arm 965 makes its initial movement clockwise, the arm 961 moving in unison therewith under tension of a spring 1024 until the extension 960 seats in the bottom of the notch 959. This, through the link 967, rocks the pawl 968 (Figs. 29 and 31) counter-clockwise, which in turn shifts the arm 971, the rod 972, and the yoke 981 toward the front of the machine. This places a rounded extension 1025 of the yoke 981 in the path of a cam 1026 secured on a printer cam shaft 1027 journaled in the frames 453 and 951. The shaft 1027 makes one counter-clockwise revolution (Fig. 30) each time the machine operates. In adding and subtracting operations this counter-clockwise movement starts immediately after the machine is released for operation. In total taking operations this counter-clockwise movement starts at the beginning of the second cycle of movement of such operation. In this case the yoke 981 is not shifted until the arm 1026 has revolved beyond the projection 1025. Therefore, during this operation the sliding table will not be automatically line-spaced, but the condition has been set up whereby automatic line-spacing will take place in the succeeding operation unless such condition is overcome by other means, to be described later on.

The next item is a credit item of $60.00. This amount is set up on the keyboard and one of the keys in row 2, together with the starting bar is depressed, thus releasing the machine for a credit operation as before. The arm 1026 (Fig. 30) wipes the projection 1025 of the yoke 981, rocking said yoke in a clockwise direction, which, through the arm 986, bell crank 987, and the link 989 (see also Fig. 25) rocks the escapement plate 990 clockwise, which, through the pawls 994 and 999, in cooperation with the teeth 1003 of the rack 1004, allows the table 920 under the tension of the spring 1028 to tabulate one position to the left. The spring 1005 returns the plate 990 counter-clockwise, causing the tooth 1002 of the pawl 999 to engage the rack 1004 to retain the table 920 in its tabulated position. It will be recalled that the line finding key 927 is released near the end of the first operation, thereby surrendering control of the sliding table 920 to the escapement mechanism.

From this period on, the entering of credit or debit items causes the sliding table to line-space, as the automatic line-spacing mechanism remains effective until a balancing operation is made. Another credit item of $25.00 is entered, followed by three debit items of $300.00, $60.00, and $25.00, after which a new balance is taken. This is accomplished by depressing the new balance key 210 (Fig. 15) which, as previously explained, rocks the zero latch throwout shaft 177 clockwise as viewed in Fig. 3 and counter-clockwise as viewed in Fig. 28. The forward movement of the rod 972, as explained above, rocks the lever 975 counter-clockwise, placing the camming surface 977 in the path of the stud 978. Therefore, counter-clockwise movement of the shaft 177 and the arm 979 causes the stud 978 to engage and rock the lever 975 clockwise, which, through the rod 972 and the arm 971, shifts the yoke 981 rearwardly to ineffective position. This occurs before the cam 1026 has an opportunity to engage the projection 1025 of the yoke 981. Consequently the line-spacing mechanism is crippled and the new balance of $4,850.00 is therefore printed on the same line as the last debit item. Depressing any one of the other total keys 211 or 212 has the same effect as depressing the total new balance key 210, that is, the automatic line-spacing mechanism is rendered ineffective.

Depressing the new balance key 210 also causes the escapement mechanism to be rendered ineffective so that the sliding table may be returned to its extreme lefthand position by the spring 1028 (Fig. 24). As previously brought out, in taking a new balance, if the amount on the balance totalizer is positive, the first transaction bank latch is broken automatically in the sixth position. If the amount is negative, the first transaction bank latch is automatically broken at zero.

As shown in Fig. 25, the depression 1007 which corresponds to the zero position of the first transaction bank latch is shown opposite the stud 1009 of the arm 1010. Therefore, in case of an overdraft, the first transaction bank latch will be broken in this position. As the arm 965 makes its initial movement clockwise, the stud 964 cooperating with the arm 1010 allows said arm to move clockwise in unison therewith under tension of a spring 1029 until the stud 1009 engages the bottom of the depression 1007. This, through the arm 1012, rocks the arms 1015 and 1017 clockwise, causing the stud 1018 to pass beyond a step 1030 on the lever 1019 (see also Fig. 26). A spring 1031 then forces the lever 1019 clockwise until an abrupt surface thereon contacts the stud 1018, to place the step 1030 in the path of said stud 1018. Return movement counter-clockwise of the arm 965, through the arm 1010 and bell crank 1012, positively returns the arms 1015 and 1017 counter-clockwise, which, through the lever 1019, forces the plate 1020 toward the left, causing the camming surface 1022 thereon, in cooperation with the stud 1023, to rock the pawl 999 clockwise out of engagement with the teeth of the rack 1004 (Fig. 24). The spring 1028 then returns the sliding table 920 to its extreme lefthand position to facilitate the removal and insertion of ledger cards.

Exactly the same thing occurs during positive new balance operations in which the first transaction bank latch is automatically broken in the sixth position, which places the depression 1008 of the disk 1006 in the path of the stud 1009. Breaking of the first transaction bank latch in positions other than zero or six locates the disk 1006 so that the periphery 1032 thereof is opposite the stud 1009, thereby blocking the clockwise movement of the arm 1010.

As the sliding table 920 (Figs. 25, 26, and 27) approaches its extreme lefthand position, a bracket 1033 engages a rounded projection 1034 of an arm 1035 rotatably supported by one of the studs 1021, rocking said arm counterclockwise, causing an extension 1036 thereof to engage and rock the lever 1019 counter-clockwise to disengage the step 1030 from the stud 1018. A spring 1037 then returns the plate 1020 toward the right, moving the step 1030 of the lever 1019 beyond the stud 1018 and allowing said lever 1019 to come to rest on said stud 1018 when the sliding table is moved from its left-hand position. A stud 1038 in the plate 1020 cooperates with a V notch in the arm 1035 to limit the movement of said arm 1035.

Manual means have also been provided for disengaging the escapement pawl 999 (Fig. 24) from the rack 1004 to release the sliding table 920. Such means includes a finger-piece 1039 (Figs. 22 and 23) pivotally supported by a bracket 1040 carried by the sliding table 920. The finger-piece 1039 is connected by a yoke to an arm 1041 pivoted on the bracket 925. A link 1042 connects the arm 1041 to a plate 1043 supported for slight angular sliding movement on the bracket 925, by means of studs 1044 which cooperate with angular slots in said plate 1043. The lower edge of the plate 1043 cooperates with the stud 1023 carried by the pawl 999. Pressing downward on the finger-piece 1039, through the link 1042, forces the plate 1043 downwardly against the tension of a spring 1045, causing said plate to engage the stud 1023 to rock the pawl 999 (see also Fig. 24) out of engagement with the rack 1004 to release the sliding table 920. When pressure is removed from the fingerpiece 1039, the spring 1045 returns the plate 1043 upward to its normal position, as shown in Fig. 22.

In proof-reading operations it is necessary that the proof card 948 (Fig. 19) be line-spaced every operation of the machine in order to print the different items on separate lines. As all the items in a proof-reading operation are the result of total taking operations, it is necessary to render ineffective the mechanism which cripples the line-spacing mechanism when a balance operation is performed. Also in proof-reading, there are two balancing operations which, as previously brought out, generally disengage the escapement mechanism from the rack 1004 (Fig. 24) and allow the table 920 to be returned to its extreme lefthand position by the spring 1028. In order to prevent this releasing of the table 920 in proof-reading operations, mechanism has been provided for blocking the clockwise movement of the arm 1010 (Fig. 25).

Secured on the shaft 1027 (Figs. 25 and 29) is an arm 1046 having a projection 1047 which cooperates with an arm 1048 of a yoke 1049 loosely supported by the shaft 980. Another arm 1050 of the yoke 1049 is bifurcated to embrace a stud 1051 carried by the yoke 981. The bail of the yoke 1049 is slotted to receive an arm 1052 of a slide 1053 loosely supported by the rod 972 and having an extension 1054 pivoted to an arm 1055 of a lever 1056 pivoted on the stud 976 (Fig. 28). The lever 1056 is connected by a link 1057 to an arm 1058 loose on the shaft 177. The arm 1058 in turn is connected by a link 1059 to a lever 1060 rotatably mounted on a stud 1061 secured in the frame 107. Secured in the frame 107 is a stud 1062 which cooperates with notches 1063 and 1064 in a retaining slide 1065 having a slot through which extends the stud 1061 and a stud 1066 secured in an extension 1067 of the lever 1060. A spring 1068 is tensioned to hold the notches 1063 and 1064 in engagement with the stud 1062. The slide 1053 (Figs. 28, 29, and 32) has a projection 1069 carrying a stud 1070 embraced by a slot in a bell crank 1071 rotatably supported by the stud 969. A link 1072 (see also Fig. 25) pivotally connects the bell crank 1071 to an arm 1073 rotatably supported by the shaft 451. The arm 1073 has a projection 1074 which cooperates with a point 1075 of the arm 1010.

With the lever 1060 in its upward position, as shown in Fig. 28, the arm 1048 (Fig. 29) of the yoke 1049 is retained out of the path of the projection 1047 of the arm 1046. Consequently, rotation of the printer cam shaft 1027 has no effect upon this yoke. Therefore, the tabulating of the sliding table 920 is controlled by the automatic line-spacing or tabulating mechanism, which in turn is controlled by the second and third transaction banks, as explained hereinbefore. Likewise, when the lever 1060 is retained in its upward position, the projection 1074 (Fig. 25) of the arm 1073 is held out of the path of the point 1075 of the arm 1010. Therefore the escapement releasing mechanism remains under the control of the total new balance key 210, as previously explained.

Moving the lever 1060 downwardly (Fig. 28), through the link 1059, the arm 1058, and the link 1057, rocks the lever 1056 counter-clockwise to shift the slide 1053 frontwardly, which in turn shifts the yoke 1049 to place the arm 1048 in the path of the projection 1047 of the cam 1046 (Fig. 29). Rotation of the shaft 1027 (Fig. 25) causes the projection 1047 to engage the arm 1048 to rock the yoke 1049 and the yoke 981 in a clockwise direction, as viewed in Figs. 25 and 30. This causes the escapement mechanism to work in exactly the same manner as explained earlier herein for the yoke 981. This line-spaces the sliding table 920 every operation of the machine, regardless of the type of operation, as long as the lever 1060 is in its downward position. The forward shifting of the slide 1053, when the lever 1060 is moved downwardly, through the extension 1069 (Figs. 25 and 32) rocks the bell crank 1071 counter-clockwise, which, through the link 1072, rocks the arm 1073 in a counter-clockwise direction to place the projection 1074 in the path of the point 1075 to retain the arm 1010 in its ineffective position. This prevents release of the escapement mechanism when a balance operation is performed. Therefore in proof-reading operations the result illustrated in Fig. 19 is obtained.

Since the operation of the various mechanisms, and particularly the automatic line-spacing mechanism and the controlling means therefor, under the control of the first transaction bank, have been described in operation form in connection with an illustrative system along with the detailed description of this mechanism, it is not thought necessary to give any further description of this mechanism at this time.

While the form of mechanism herein shown and described is admirably adapted to fulfill the objects primarily stated, it is to be understood that it is not intended to confine the invention to the form or embodiment herein disclosed, for it is susceptible of embodiment in various forms, all coming within the scope of the claims which follow.

What is claimed is:

1. In a machine of the class described, the combination of a laterally movable table; means for moving the table step by step in one direction; control means for rendering the step by step moving means effective during certain kinds of machine operations; means for modifying the control by the control means for rendering the step by step moving means ineffective during other kinds of machine operations; and means, superseding the normal controls for the step by step moving means, for rendering the step by step moving means effective during any kind of machine operation.

2. In a machine of the class described, the combination of a laterally movable table; means for moving the table step by step in one direction; means automatically shiftable to a position to render the step by step moving means effective during adding and subtracting operations; means to readjust the shiftable means to render the step by step moving means ineffective during total printing operations; and means for rendering the step by step moving means effective with the shiftable means in either position and during any kind of machine operation.

3. In a calculating machine, the combination of a laterally movable table; normally silent means for moving the table step by step in one direction; automatic means for rendering the step by step moving means operable during adding and subtracting operations; means automatically operable in total taking operations to cause the automatic means to be operated to disable the step by step moving means during total taking operations; and manually operated means cooperating with the automatic means for rendering the step by step moving means effective during all machine operations even when the means has operated in total taking operations to disable the automatic means.

4. In a calculating machine, the combination of a laterally movable table; escapement means for moving the table step by step in one direction; actuating means rendered effective during certain kinds of machine operations for operating the escapement means; means cooperable with the actuating means during other kinds of machine operations to disable the actuating means for the escapement means; and manually operated means for controlling the actuating means for the escapement means so that the escapement means will operate during all kinds of machine operations.

5. In a machine of the class described, having printing means; a laterally movable table for presenting record material, having a plurality of lines, to the printing means; and selective means for positioning any desired line on the record material opposite the printing means, the combination of means superseding the selective means for assuming control of the positioning of the table after the first machine operation; means rendered effective during certain kinds of machine operations for operating the superseding means to line-space the record material; means effective during other kinds of machine operations for rendering the superseding means operating means ineffective; and manual means for overriding the control of the superseding means operating means in said certain operations and said other operations for rendering the superseding means operating means effective at all times.

6. In a calculating machine capable of different kinds of operations including adding-subtracting and total taking operations, and having printing means; a laterally movable table for presenting multi-lined impression material to the printing means; and means for selectively positioning the table to aline the desired line on the impression material with the printing means; the combination of escapement means for moving the table step by step in one direction to line-space the impression material; means for causing the escapement means to assume control of the positioning of the table after the first machine operation; actuating means rendered effective during certain kinds of machine operations for operating the escapement means to line-space the impression material; means effective during other kinds of machine operations for rendering the escapement operating means ineffective; and means superseding the control of the operating means in said certain and said other operations for rendering the escapement operating means effective during any kind of machine operation.

7. In a calculating machine having printing means; a laterally movable table for presenting multi-lined record cards to the printing means; and means for selectively positioning the table to aline the desired line on the card with the printing means, the combination of escapement means normally operatively connected to the table and adapted to move said table step by step in one direction to line-space the card; means for causing the escapement means to assume full control of the positioning of the table after the first machine operation; means effective during adding and subtracting operations for causing the escapement means to function to line-space the card; means effective during total printing operations for rendering the escapement operating means ineffective; and means effective during certain total printing operations for also disconnecting the escapement means from the table to allow said table to return to normal position.

8. In a calculating machine adapted to print on multi-lined record material, and having printing means; a laterally movable table for presenting the record material to the printing means; and selective means for predetermining upon which line of the record material the first impression is to take place; the combination of normally inoperable means for moving the table step by step from any predetermined position to line-space the record material; means rendered operable during certain kinds of machine operations for rendering the step by step moving means operable; and means effective during other kinds of machine operations for disabling the means which is rendered operable in said certain operations to prevent the operation of the step by step moving means in said other operations.

9. In a calculating machine adapted to print on multi-lined record material, and having printing means; a laterally movable table for presenting the record material to the printing means; and a plurality of keys for predetermining upon which line of the record material the initial printing is to take place, the combination of escapement means operatively connected to the table for moving said table step by step from any predetermined position to line-space the record material; means operable during adding or subtracting operations for rendering the escapement means effective, means rendered operable during total printing operations for rendering the escapement means ineffective; manual means for rendering the escapement means effective during any kind of machine operation; and means whereby the escapement means is disconnected from the table near the end of certain total printing operations to allow said table to return to normal position.

10. In a calculating machine adapted to print on multi-lined record material, and having printing means; a laterally movable table for presenting the record material to the printing means; and a plurality of keys carried by said table for predetermining upon which line initial printing is to take place, the combination of a rack carried by said table; escapement means arranged to cooperate with the rack to move the table step by step from any predetermined position; means effective during adding or subtracting operations for operating the escapement means to line-space the record material; means for rendering the escapement operating means ineffective during total-taking operations; and means for automatically disconnecting the escapement means from the rack near the end of balancing operations to allow the table to return to normal position.

11. In a calculating machine having a balance totalizer; a differential latch mechanism for selecting the totalizer in adding and subtracting operations; printing means; a laterally movable table for presenting multi-lined record material to the printing means; yieldable means for returning the table to normal position; and a plurality of keys carried by said table for designating upon which line of the record material the first impression is to be made, the combination of a rack carried by said table; escapement means arranged to cooperate with the rack to allow the table to be moved step by step from any designated position by yieldable means; means for operating the escapement means; means controlled by certain positions of the differential latch mechanism for rendering the escapement operating means effective; and means effective during total printing operations for rendering the escapement means ineffective.

12. In a calculating machine having a balance totalizer; a differential latch mechanism for selecting the balance totalizer for adding or subtracting operations; printing means; a laterally movable table for presenting multi-lined record material to the printing means; yieldable means for returning the table to normal position; and a plurality of keys carried by said table for designating upon which line of the record material the first impression is to be made, the combination of a rack carried by said table; escapement means arranged to cooperate with the rack to allow the table to be moved step by step from any designated position by the yieldable means; means for operating the escapement means; means operable in certain positions of the differential latch mechanism for rendering the escapement operating means effective; means effective during total printing operations for rendering the escapement operating means ineffective; means rendered effective in certain other positions of the differential latch mechanism for disengaging the escapement means from the rack to allow the yieldable means to return the table to normal position; and manual means for rendering the escapement operating means effective at all times and simultaneously rendering ineffective the escapement disengaging means.

13. In a calculating machine adapted to print on multi-lined record material, and having printing means; a table for presenting the record material to the printing means; and a plurality of keys for locating the table to select the desired line of the record material for the first impression, the combination of means for moving the table step by step from any selected position to line-space the record material; a shaft for operating the step by step moving means; normally ineffective means for operatively connecting the step-by-step moving means to the shaft; means for rendering the connecting means effective during adding or substracting operations; and means for rendering the connecting means ineffective during total printing operations.

14. In a calculating machine having a balance totalizer; a differential latch mechanism for selecting the totalizer in adding and subtracting operations; printing means; a laterally movable table for presenting multi-lined record material to the printing means; and a plurality of keys carried by the table for selecting the desired line of the record material, the combination of means, including two shiftable members, for moving said table step by step from any selected position; a shaft for operating the moving means; two projections on the shaft; automatic means for operatively alining one of the shiftable members with one of the projections when the latch mechanism is broken in certain positions; means for moving one shiftable member out of alinement with the one projection during total printing operations; means controlled by certain other positions of the latch mechanism for disabling the moving means; and means for operatively alining the other shiftable member with the other projection and for simultaneously rendering the disabling means for the moving means inoperative.

15. In a calculating machine having a balance totalizer; a differential latch mechanism for selecting the totalizer for adding or subtracting operations; printing means; a laterally traveling table for presenting multi-lined record material to the printing means, the combination of escapement means adapted to cooperate with the table to present successive lines on the record material to the printing means; means for operating the escapement means when the latch mechanism is broken in certain positions; means for disabling the operating means during total printing operations; and means for operating the escapement means regardless of the position of the latch mechanism and regardless of the disabling means.

16. In a machine of the class described, having a balance totalizer; a differential latch mechanism for selecting the totalizer in adding and subtracting operations; printing means; and a laterally movable table for presenting multi-lined record material to the printing means, the combination of a rack on said table; escapement means adapted to cooperate with the rack to present successive lines of record material to the printing means; means for operating the escapement means when the latch mechanism is broken in certain positions; means for disabling the operating means during total printing operations; means for disengaging the escapement means from the rack when the latch mechanism is broken in certain other positions; and means for causing the escapement means to operate and for rendering ineffective the escapement disengaging means regardless of the position in which the latch mechanism is broken.

17. In a machine of the class described, having a balance totalizer; a differential latch mechanism for selecting the balance totalizer in adding and subtracting operations; printing means; a laterally movable table for presenting multi-lined record material to the printing means; and manipulative means for selecting any desired line on the record material for initial printing, the combination of a rack on the table; escapement means arranged to cooperate with the rack to move the table step by step from any selected position; means for operating the escapement means when the latch mechanism is broken in certain positions; means for disabling the operating means during total printing operations; means for disengaging the escapement means from the rack when the latch mechanism is broken in certain other positions; and means for causing the escapement means to operate and for rendering ineffective the escapement disabling means irrespective of the position in which the latch mechanism is broken.

18. In a machine of the class described, the combination of a laterally movable table; means for moving the table step by step in one direction; operating means for the step by step moving means; means rendered operable in certain operations to couple the step by step moving means to the operating means, means operable in other operations to restore said coupling means to uncoupling condition; and means settable to connect the coupling means to the operating means in all kinds of operations so that the step by step moving means can be operated by its operating means when the coupling means is in both its normal coupled and uncoupled condition.

BERNIS M. SHIPLEY.
PASCAL SBURLINO.
EVERETT H. PLACKE.